INVENTOR
P. A. HARDING
BY
[signature]
ATTORNEY

MAGNETIC MEMORY WIRING ORGANIZATION

Filed Dec. 13, 1963

United States Patent Office 3,394,357

Patented July 23, 1968

3,394,357

MAGNETIC MEMORY WIRING ORGANIZATION

Philip A. Harding, Middletown, N.J., assignor to Bell Telephone Laboratories, Incorporated, New York, N.Y., a corporation of New York Filed Dec. 13, 1963, Ser. No. 330,403
27 Claims. (Cl. 340—174)

ABSTRACT OF THE DISCLOSURE

Storage devices of a magnettic memory are arrayed in mutually perpendicular first and second drive planes and digit planes. The drive plane circuits are divided into plural parts along lines that are different from similar division lines for sensing circuits of the memory digit planes. The inhibit circuits in the digit planes are also divided to minimize the number of linkages between any energized inhibit circuit and other drive circuits. A number of embodiments show different types of circuit divisions used to enhance further the output noise reduction produced by the basic circuit division approach.

This invention relates to a memory system and is particularly applicable to memory systems utilizing magnetic storage devices.

The use of coordinate, or matrix, arrays of bistable information bit storage devices has been gaining in popularity in recent times. One such device is a magnetic storage element having a substantially rectangular hysteresis characteristic defining two stable states of remanent flux density between which the device may be switched by the application of magnetomotive forces of appropriate polarity and intensity. The two states are utilized to represent binary ONE and ZERO bits in a binary code system of representing information. The present invention will be described in connection with a memory array utilizing a particular form of such magnetic devices although it is to be understood that the underlying principles of the invention are not so limited in their utility. This particular form of devices is a pierced sheet of ferrite material wherein the portion of the material surrounding each hole is operated as an individual bistable device such as a toroidal core of ferromagnetic material.

Each device in an array has a discrete address which can be defined in terms of the array coordinates. The present invention will be described in terms of a three-dimensional rectilinear, matrix, memory array; but the principles can be readily applied to other arrays by those skilled in the art. The coordinate designations used are X, Y, and Z for three mutually perpendicular coordinate directions. Coincident drive signals are applied along the Z coordinate to assist in the write-in operation. Read-out sensing is also accomplished along the Z coordinate.

Present day systems for computing and for communication system line finding applications are required to accommodate information words of increasing length and quantity as the complexity of the underlying system increases. Storage facilities for such words are usually employed, and memories providing such storage must also be appropriately larger. The larger memories are known to have certain advantages over smaller memories in that they can be operated by a single unified control and can utilize access switching equipment reasonably efficiently. However, the larger memories are at a disadvantage with respect to small memories, in the magnetic, matrix, memory field particularly, in that noise voltages accumulate along any given sensing circuit to a level which can mask a desired read-out signal.

It is therefore one object of the present invention to organize a large magnetic memory to realize some of the advantages of small memory arrays.

A further object of the invention is to organize the operating circuits of a coincident current memory to reduce sensing circuit noise.

Another object is to increase the storage flexibility of magnetic memories.

These and other objects of the invention are realized in an illustrative embodiment in which memory storage devices are arranged in a three-dimensional matrix array of mutually perpendicular first and second drive planes and digit planes. The drive plane circuits are divided into plural parts along lines that are different from similar division lines for sensing plane circuits of the memory digit planes. Thus, only predetermined sections of selected memory planes are activated in each coincident current selection operation, and these sections are geometrically interlocked with one another by means of the sensing circuit sections. The inhibit circuits of the memory digit planes are also divided to minimize the number of linkages between any energized inhibit circuit and other drive circuits.

It is a feature of the invention that the drive plane circuits in different ones of the divided parts, along any one coordinate, all have identical addresses within their respective parts and share a single set of access switches.

It is another feature of the invention in one form thereof that a large memory array is divided into quadrants along perpendicular division planes such that one plane divides the memory into A and B halves and the other divides the memory into G and H halves. Memory drive circuits are adapted to drive storage devices in either the G or H half, but each sensing circuit is coupled to devices in only the A or the B half of the memory. This division of the drive and sensing circuits in the memory reduces the number of half selected devices which are also coupled to an active sensing circuit to a fraction of what would have been required using prior art techniques.

Another feature is that each half of a sensing circuit in any given digit plane is separately addressed for coupling only one half at a time to a single binary single discriminator for the sensing plane in accordance with the address of the selected word of the memory.

Still another feature of the invention is that, within each of the G and H halves of the memory, a drive circuit that is in a plane that is perpendicular to the G–H division plane is further subdivided into two series connected parts that are physically slipped with respect to one another so that one part lies in the A half of the memory, and the other part lies in the B half of the memory. The plane-slipping aspect of the memory organization further reduces the number of half-selected devices in the corresponding drive coordinate which also lie in the sensed part of each digit plane.

An additional feature is that by dividing drive circuits in the manner described the over-all store is enabled to grow to four times the size that would otherwise be permissible because any one driver is loaded by only half of the devices in a corresponding memory plane at any one time.

Yet another feature of the invention is that in memories which employ pierced ferrite sheets constituting discrete bistable magnetic switching portions arranged in a matrix array of rows and columns, and having one drive circuit integrally related to every hole on at least one sheet, a standard sized basic sheet is efficiently utilized to accommodate words of different lengths without interrupting the one drive circuit. This is accomplished advantageously, without breaking the one drive circuit, by arranging other memory circuits to permit storage of plural words on a single row of holes linked by the one drive circuit.

A further feature of the invention is that the inhibit circuit arrangement which minimizes linkages of such circuit with other active drive circuits also makes it possible to activate the inhibit circuits in each digit plane so that such circuits present a constant load to other drive circuits, regardless of the nature of the binary information being stored. Furthermore, the inhibit and sensing circuits in each digit plane are orthogonally divided so that the mutual linkages between activated parts of each are reduced in number and the inhibit noise coupled to the sensing circuit is thereby reduced.

A feature of an embodiment of the invention is that the inhibit circuit in each digit plane of the memory is divided into plural parts driven by EXCLUSIVE OR logic in each memory cycle so that a substantial reduction is realized in sensing circuit delta noise generated as a result of magnetic bias imposed by inhibit circuit signals.

The invention and its various features, objects and advantages may be better understood from a consideration of the following detailed description and the appended claims, in connection with the attached drawing in which:

Figure 1:
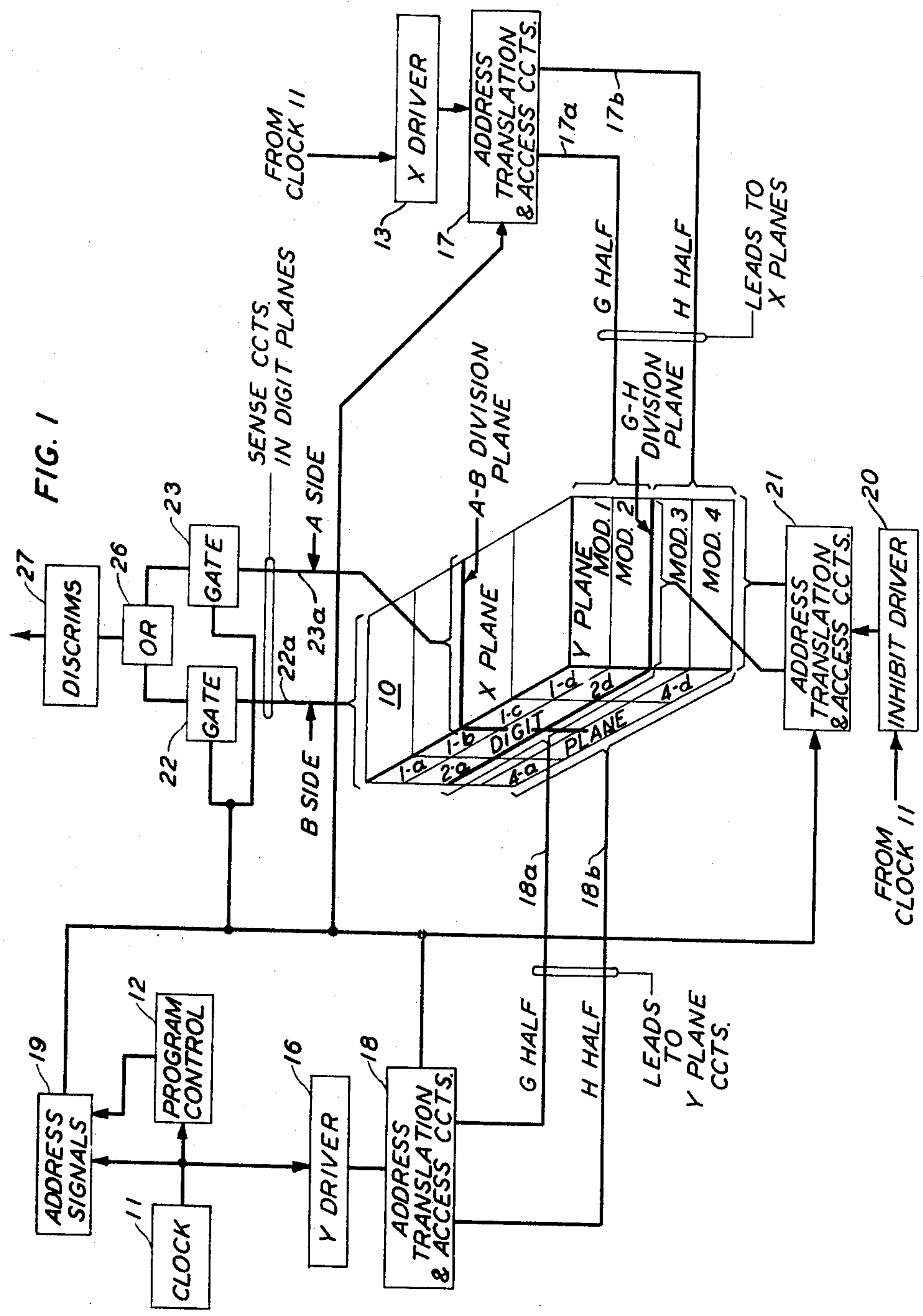
FIG. 1 is a simplified block and line diagram of a memory system in which the invention is employed.

In FIG. 1 there is shown in three-dimensional form a block representing the storage devices of a memory 10. This block will hereinafter be considered, for convenience of description, as being divided into four quadrants by an A–B division plane and a G–H division plane which are perpendicular to one another. The features of the present invention will be described in connection with a magnetic memory utilizing apertured ferrite sheets of the type shown in FIGS. 6 through 8, but it is to be understood that many of the principles of the invention are more broadly applicable and need not be restricted to memories utilizing that particular type of storage medium.

The memory 10 includes 16 submodules, and each submodule comprises a plurality of ferrite sheets as will be presently described. Each horizontal group of four submodules constitutes a module. The modules in FIG. 1 are numbered 1 through 4, respectively, as indicated on the front surface of the memory 10. The four submodules of each module are identified by reference characters wherein a numeral indicates the module and a letter indicates the location of the submodule within a module. Thus, the submodule 1–*a* is in Module 1 at the rear of the memory on the B side of the A–B division plane, and on the G side of the G–H division plane. Similarly, a submodule designated 4–*d* lies in Module 4 in the front of the memory block 10 on the A side of the A–B division plane and on the H side of the G–H division plane. In FIG. 1 only enough submodules bear their reference characters to show the pattern for deriving the characters.

The memory 10 is a coincident current memory that is driven by circuits lying in three, mutually perpendicular, interrelated sets of planes. These are herein designated X planes, Y planes, and digit planes. The orientation of the X planes, Y planes, and digit planes with respect to one another is indicated on three different surfaces of the memory 10 in FIG. 1. Any given row of storage locations may be defined by the intersection of an X plane and a Y plane, but such row is not necessarily limited to the storage of a single binary coded word, as will be hereinafter discussed. Individual locations in that row may be either sensed or controlled for write-in purposes by appropriate circuits in each of the corresponding digit planes of the memory. The arrangement and operation of coincident current memories in general are well known in the art and will be described here in only sufficient detail to demonstrate the arrangement and operation of the invention.

In accordance with one aspect of the invention the drive circuits of the memory are divided into two groups on opposite sides of the G–H division plane, and corresponding memory locations on each side of that plane have identical addresses. A clock 11 is utilized to time a program controller 12 and to actuate an X driver 13 and a Y driver 16 for supplying drive signals to the memory. The drivers 13 and 16 supply pulses to address translation and access circuits 17 and 18 which also receive address signals from an address signal source 19 that is jointly controlled by clock 11 and program controller 12.

The translation and access circuits 17 and 18 are of the type disclosed in the copending application of C. G. Corbella, P. A. Harding, and E. H. Siegel, Jr., Ser. No. 241,736, filed Dec. 3, 1962, now United States Patent 3,205,481, which issued Sept. 7, 1965. The specific arrangement of such circuits is outlined hereinafter in connection with FIG. 9A, and only general aspects are presented here. This type of translation and access circuits makes possible the use of a single set of access switches for controlling plural groups of storage devices with corresponding device addresses in each group. Address signal responsive selector switches select the correct group of devices and cause the access switches to control that group only. In accordance with the teachings of Corbella et al. the circuits 17 and 18 utilize a single set of access switches for corresponding X and Y addresses in both the G and the H halves of the memory 10. Selector switches, which are responsive to addresses from source 19, are also employed in cooperation with the access switches to route drive pulses to either the G or the H half of the memory in accordance with the dictates of the address from the source 19. Since selector switches and access switches are usually the most expensive elements of the translation and access circuits, a substantial cost saving is realized by having a single set of access switches serve plural groups of devices. In addition to the equipment cost savings, the division of the memory in the manner described is adapted, in accordance with the present invention, to achieve noise reduction advantages not heretofore attainable.

Cables **17*a* and 17*b* in FIG. 1 connect circuits 17 to the G and H halves, respectively, of memory 10. Each cable includes separate circuit connections (not shown) to the individual parallel X-plane circuits of the memory 10. Each such X-plane circuit extends through both the A half and the B half of the memory. In a similar manner cables 18*a* and 18*b* connect circuits 18 to individual Y plane circuits in the G and H halves, respectively, of memory 10**. It will subsequently be shown that each Y circuit extends through only one of the G and H halves of the memory but has circuit parts in both of the A and B halves.

An inhibit driver 20 is also actuated by output pulses from clock 11 and supplies inhibit pulses through address translation and access circuits 21 to the inhibit circuits included in respective digit planes on memory 10. Translation and access circuits 21 also receive address signals from the address signal source 19 and supply drive pulses to appropriate memory locations in either the G half or the H half of memory 10 as indicated by the address signals. The translation and access circuits 21 are advantageously of the type disclosed for inhibit circuits in the copending application of P. A. Harding, Ser. No. 294,506, filed July 12, 1963. The circuits 21 differ from the circuits 17 and 18 in that the circuits 21 are adapted to enable the single driver 20 to supply drive pulses simultaneously to all digit planes, instead of just one plane, of the memory wherein it is desired to write a ZERO in accordance with the signals from source 19.

Each inhibit circuit extends through both the A and B halves of the memory but through only one of the G or H halves of the embodiment illustrated in FIG. 1. The inhibit circuit division also reduces the extent of coupling between any inhibit circuit and a sensing circuit in the same plane so that there is less inhibit noise coupled to the sensing circuit. Consequently a smaller time guard space is required between memory read-write cycles to permit such noise to be dissipated.

Each digit plane of the memory also includes two sensing circuits. Each sensing circuit extends through both the G and H halves of the memory but through only the A or the B half. The sensing circuit parts on each side of the A–B division plane are coupled to control gates 22 and 23, respectively, through individual circuits in cables 22*a* and 23*a*. Although only one gate 22, one gate 23, and their associated circuits are shown in FIG. 1, it is to be understood that a separate set of gates and associated circuits is provided for the sensing circuits in each digit plane. Gates 22 and 23 are separately actuated as required by address signals supplied from address signal source 19 so that only the sensing circuit part for the half of the memory in which a selected word is located is utilized. Gates 22 and 23 are coupled through a logical OR gate 26 to an amplitude discriminator 27 which distinguishes between binary ONE and ZERO signals.

It is to be particularly noted in connection with FIG. 1 that whereas any given X or Y drive circuit is coupled to memory locations in only the G or the H half of the memory, each individual sensing circuit is coupled to only the A or the B half of the memory. Consequently, any one sensing circuit can have induced therein the voltages corresponding to only the full-select signal at a selected bit location of the selected word and the half-select signals which are generated, in the same digit plane, by drive pulses in the selected X and Y circuits of the memory quadrant wherein the selected word is stored. Thus, in the case of a selected word in submodule 1–*d*, a sensing circuit in any given digit plane extends through both the G and H halves of the memory; but it receives noise voltages from only the G half. Within the G half that sensing circuit receives noise from only the parts of submodules 1–*c*, 1–*d*, and 2–*d* in which that digit plane coincides with the selected X and Y planes. Noise from submodule 2–*d* is also eliminated in accordance with another feature of the invention which will subsequently be described. This represents a substantial noise reduction as compared to prior art memories of the type wherein an entire digit plane sensing circuit is coupled to a discriminator on a read-out operation. In the prior art situation the sensing circuits actually would receive noise from the seven submodules 1–*a*, 1–*b*, 1–*c*, 1–*d*, 2–*d*, 3–*d*, and 4–*d*; but in the memory of FIG. 1 the sensing circuits coupled to the discriminators for reading out the same word receive noise from no more than the three of those submodules previously listed. The improvement is realized without reducing the memory capacity and without increasing the cost of access circuit hardware required because the cost of additional sensing circuit gates is offset by the reduction in the number of Y-plane access switches that are required.

A further economy also results from the division of drive circuits to reduce noise coupling points in the manner described. The division splits in half the load on any driver at any one time. This permits a given driver to supply a larger memory with no increase in power, load voltage, and load current. Accordingly, crosstalk problems among memory circuits are less severe than would otherwise be the case in the larger memory because the load voltages are not as large.

In FIGS. 2 through 5 the relationships of individual memory circuit windings to the memory modules are shown and separate figures are employed for each type of winding in order to bring out these relationships more clearly. A single example of each type of winding is shown in order to preserve the simplicity of the drawing. In these figures the four quadrants of the memory are separated from one another for convenience of illustration, and the same basic memory configuration is employed in each case.

Figure 2:
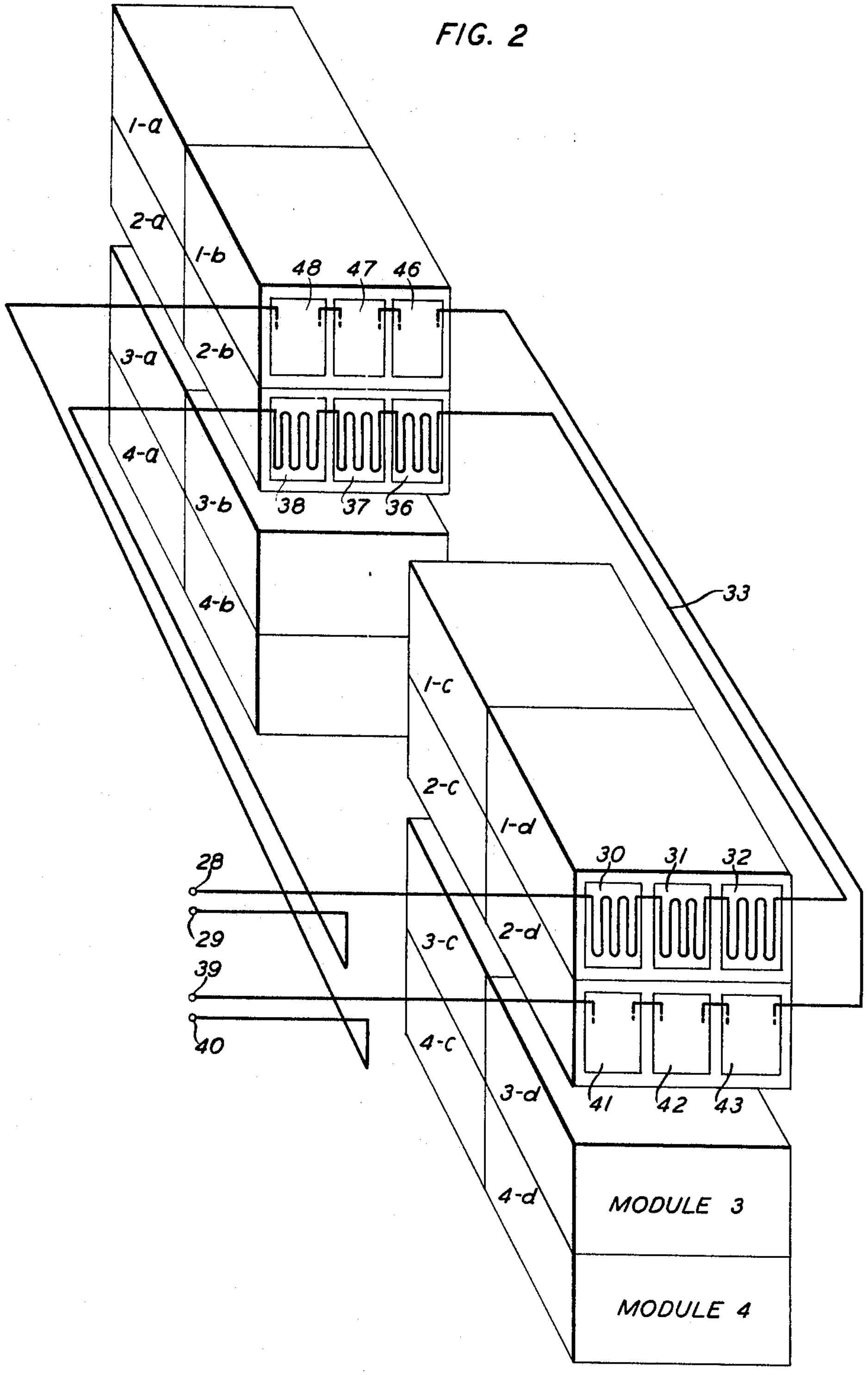
FIGS. 2 through 5 are exploded-block diagrams of key portions of the memory storage devices illustrating the relationships between the various memory windings and the submodules of the memory.
Figure 3:
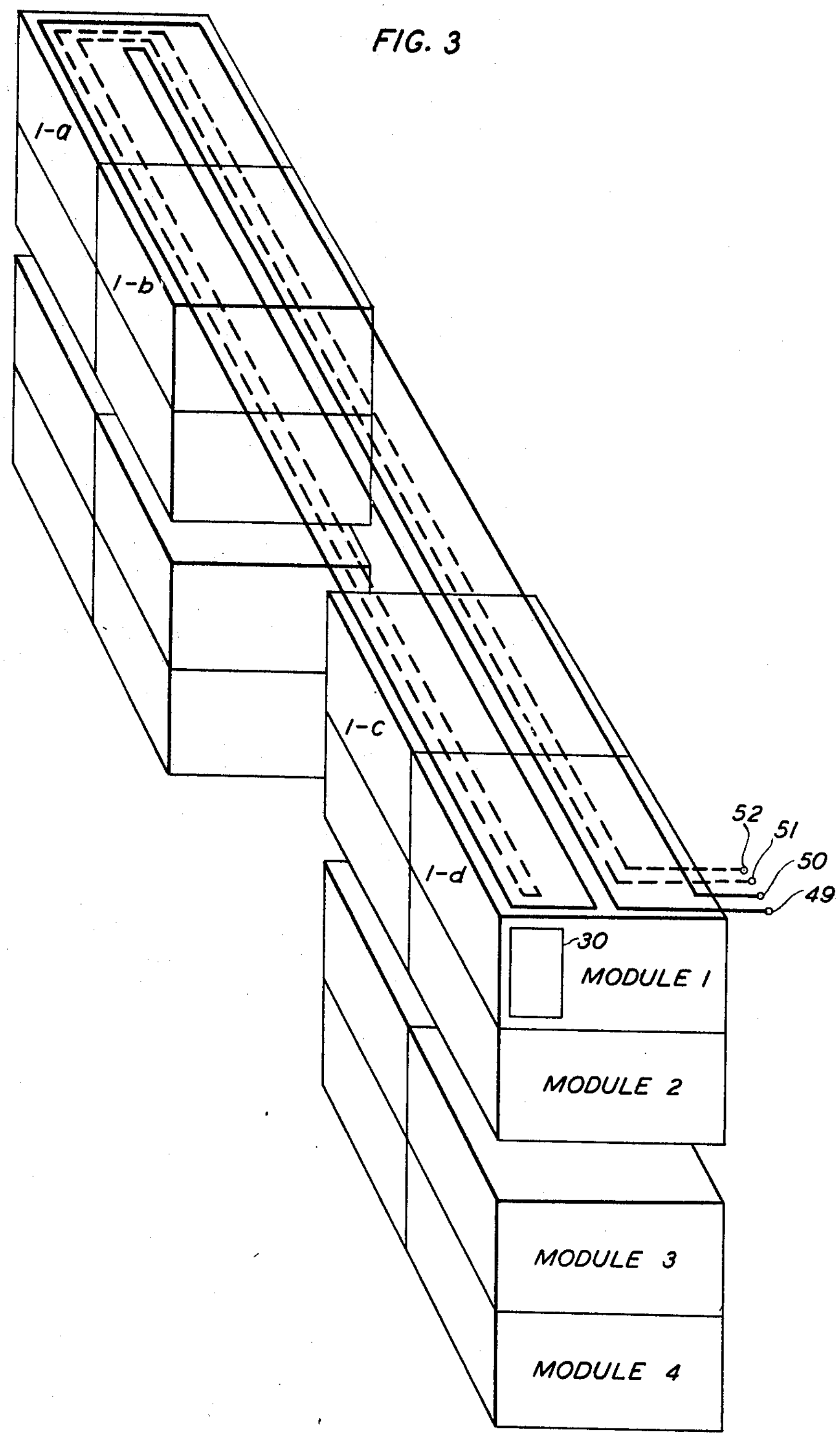
Figure 4:
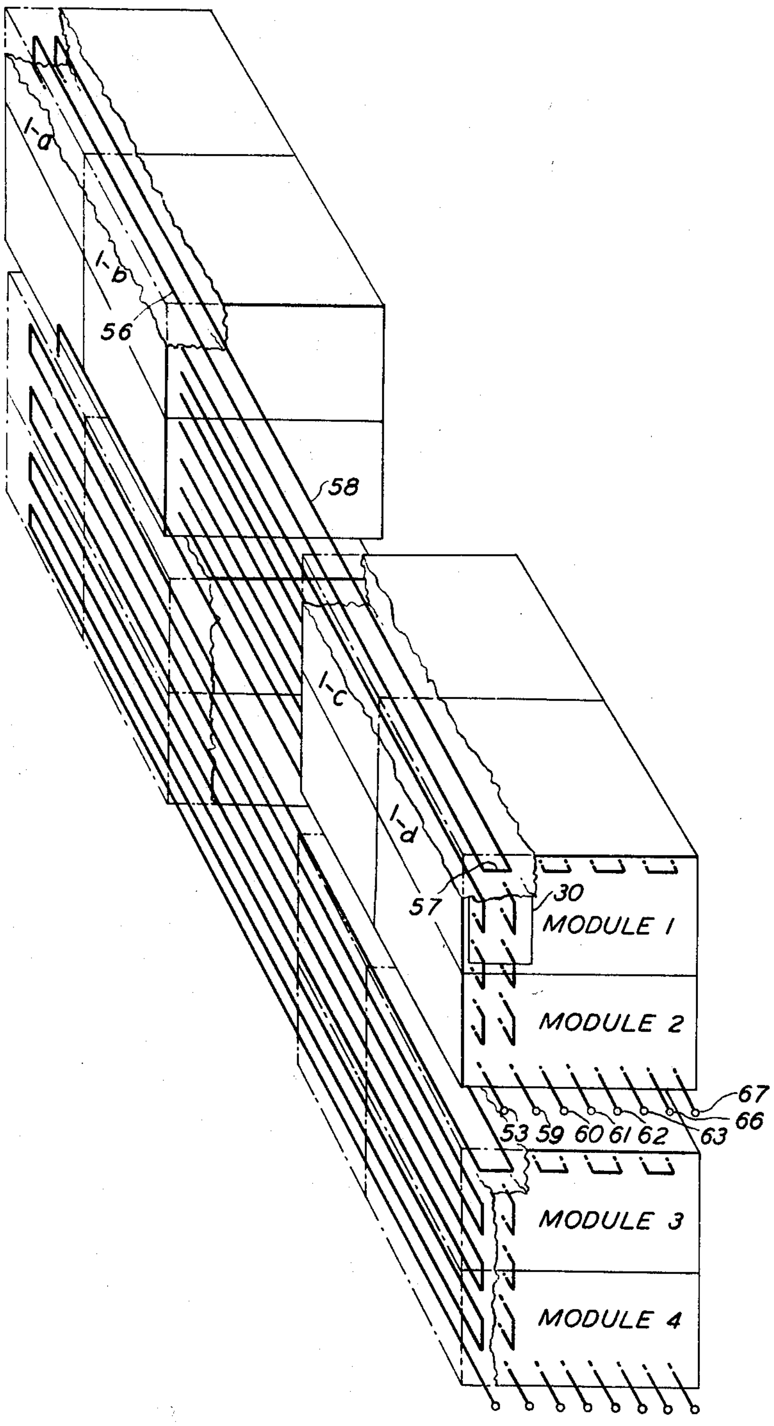
Figure 5:
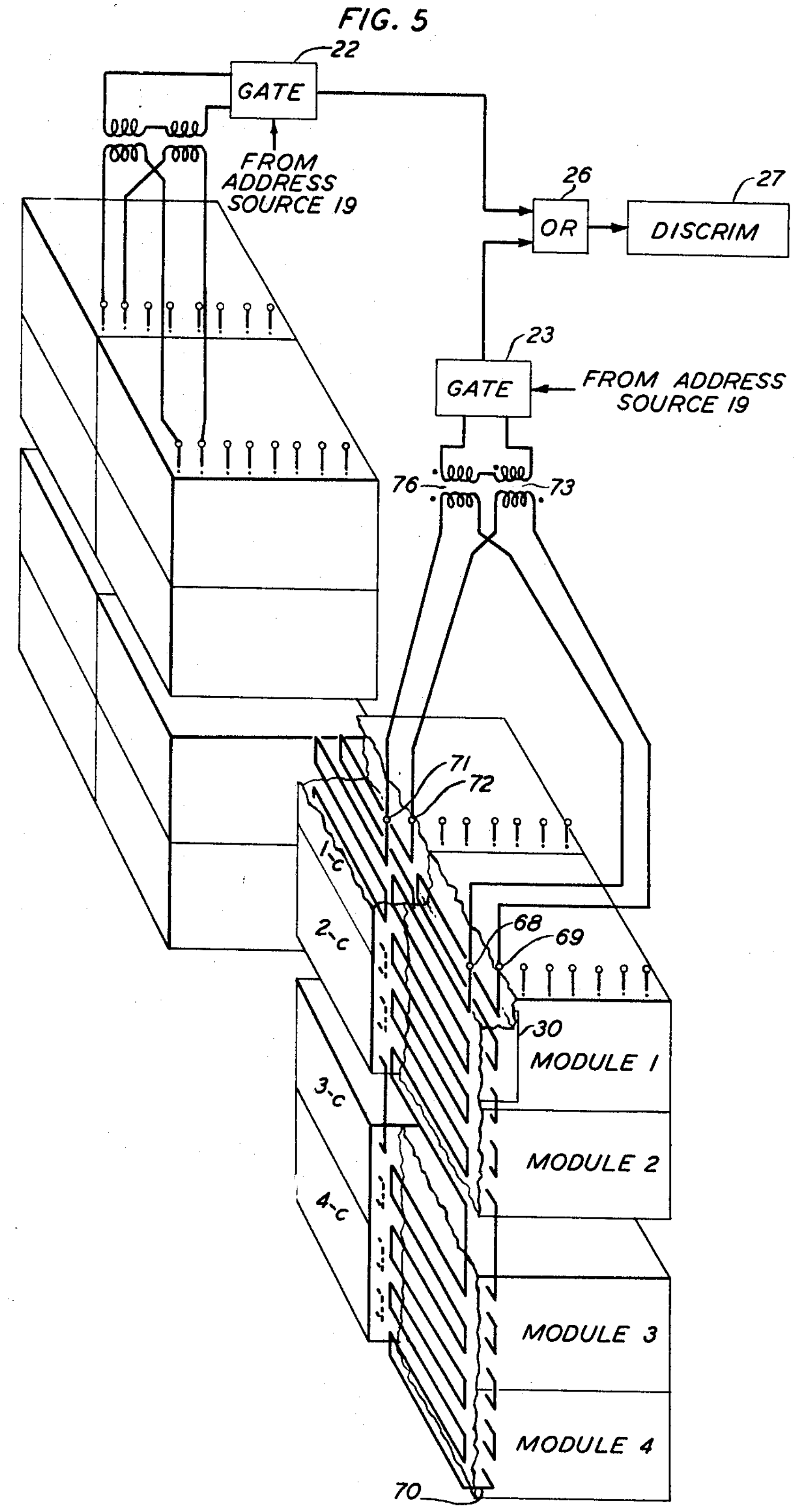

FIGS. 2 and 3 show the Y and X windings, respectively. FIG. 4 illustrates the inhibit winding and FIG. 5 shows a sense winding. In most of the FIGS. 2 through 5, only general characteristics of the windings are shown to illustrate the relationships of the windings to the memory submodules. Details of each of the winding patterns in relation to the apertured sheets to which they are coupled are presented in FIGS. 6 through 8.

In systems utilizing ferrite sheet memories it is advantageous to utilize a single standard sheet size for as many different memory applications as possible and thereby simplify manufacturing and inventory requirements. However, use of a standard sheet size creates problems of efficient utilization of sheet holes and manufactured material. Each memory application may involve the storage of basic memory words which are of a different length from the words utilized in other memory applications. The result is that a straightforward utilization of prior memory wiring and operating techniques compels inefficient utilization of the holes in a standard sheet for any memory application wherein the basic word length is not equal to one coordinate hole dimension of a standard ferrite sheet or an integral multiple of such dimension. Furthermore, it is convenient to manufacture apertured ferrite sheets with one of the memory circuits integrally related thereto, e.g., plated thereon. It was not heretofore possible to store plural words in a single row of the sheet with a word length which was an integral submultiple of the row hole dimension, because it was not convenient after manufacture to break a plated circuit into separate parts corresponding to the desired word lengths. Also, it is not efficient to manufacture a sheet with a continuous plated circuit and then cut the sheet or the circuit into parts. In accordance with the present invention, these difficulties of hole and material utilization are overcome by the winding arrangements illustrated in FIGS. 2 through 5.

In FIG. 2 individual ferrite sheets are indicated by rectangles in two Y planes of the G half of the memory, i.e., in Modules 1 and 2. Each sheet plane of a module illustrated has three sheets side by side, and all sheet planes of a module together comprise three horizontal stacks of sheets. It is assumed that the Y drive circuit of the memory is the plated circuit on the ferrite sheets and that any given Y plane circuit includes six such plated sheet circuits. A first Y circuit connected between terminals 28 and 29 includes the circuits of three sheets 30, 31, and 32 connected in series in submodule 1–*d*. These three sheet circuits are further connected in series, by a lead 33, with circuits of three additional sheets 36, 37, and 38 in submodule 2–*b*. Drive signals are applied by cable 18*a* to terminals 28 and 29 in the G half of the memory from translation and access circuits 18 in FIG. 1. If it is assumed that the selected word location is that defined by the intersection of the front Y plane of the memory and the top X plane thereof as previously considered in FIG. 1, that location lies in the top row of holes in sheets 30, 31, and 32. Sensing circuits in the front, or A, half of the memory are utilized by operation of gates 23 in FIG. 1 to couple output bit signals to the discriminator 27. Since the sheets 36, 37, and 38 lie in the B half of the memory, the half-select noise generated by the Y drive pulse in those sheets is not coupled to the A-half sensing circuits and has no effect upon the signal coupled by such sensing circuits through OR gate 26 in FIG. 1 to the discriminators 27. Thus, the sensing circuits which are utilized for the selected word receive the signals from the selected locations as desired, but they receive only one-half of the noise generated in the selected Y circuit.

In a similar manner terminals 39 and 40 have connected in series therebetween the plated Y circuits of sheets 41 through 43 in submodule 2–*d* on the A side of the memory and sheets 46 through 48 in submodule 1–*b* on the B side of the memory. Each of the other Y planes in the G half of the memory is similarly divided into two parts which are in different modules and are slipped with respect to one another so that one part less in each of the A and B halves of the memory. Y-plane circuits in the H half of the memory are arranged in a like manner.

An example of X-plane circuits in the memory is illustrated in FIG. 3. Each X plane includes a separate reentrant circuit for each word stored in a row location of the memory. A row location is the row of sheet holes of the intersection of an X plane and a Y plane. In the example of FIG. 3 there are two word locations per row location and two X circuits per X plane. One X circuit, shown in solid line form, is connected between terminals 49 and 50; and the other, shown in broken line form, is connected between terminals 51 and 52. These X plane circuits should be considered in conjunction with the digit plane circuits in FIGS. 4 and 5. Although the X-circuit leads are displaced from one another in the FIG. 3, it is to be understood that each circuit in that figure extends through every Y plane of its corresponding module.

Two X circuits per plane are utilized to permit unambiguous selection in a memory in which two different words are stored in each row of the memory. The words are arranged in bit interleaved fashion in the illustrated embodiment so that each X circuit of a given plane links only the bit locations of one single word. Other bit arrangements of the words can, of course, be employed. Each of the X circuits extends through both the A and the B halves of each X plane even though it links only a fraction of the holes in each row. All of the X planes of the memory include similar X drive circuits.

The memory in accordance with the present invention utilizes folded digit planes. This is illustrated by the inhibit circuits shown in FIG. 4 wherein the submodules are partially broken away to show the folded aspect of the circuit for the two-words-per-row example mentioned in relation to FIG. 3. The term "folded" means simply that inhibit circuits in two adjacent inhibit planes are electrically connected in series with one another to form a single folded inhibit plane circuit. Thus in FIG. 4 a lead connected to a terminal 53 extends through the entire four-submodule stack of sheets in one hole of all sheets, and it returns through another hole of all sheets. The lead continues upward through Modules 1 and 2 in the G half of the memory in a similar manner by being passed back and forth through holes in a given hole column of the ferrite sheets to form an inhibit plane.

The top portion 56 of the inhibit lead extends from submodule 1–*a* toward the front to submodule 1–*d*. At the front, the lead portion 56 is connected by a portion 57 to the top lead portion 58 of the adjacent inhibit plane. The latter lead then extends downwardly by passing back and forth through an inhibit plane in the G half of the memory which is parallel to the first-mentioned inhibit plane and ultimately connects to a terminal 59. The single inhibit circuit thus formed is connected in series between terminals 53 and 59 and defines two adjacent parallel inhibit planes which comprise one folded inhibit plane in the G half of the memory and extending through both of the A and B halves of the memory. Other similar folded inhibit planes are formed between the terminal pairs

60–61, 62–63, and 66–67. A similar series of folded inhibit planes is formed in the H half of the memory.

Although the inhibit circuits are normally utilized when no sensing circuits are activated, noise is nevertheless a problem because a finite time guard space must be allowed for inhibit circuit noise to subside before a read-out operation is begun. The division of the inhibit drive circuits between the G and H halves of the memory reduces the guard space required as previously noted. In addition the inhibit division is utilized to reduce the number of sheet holes that must be driven at any one time by the inhibit driver and thereby enable a single inhibit driver of the type shown in my copending application Ser. No. 294,506 to handle a larger number of digit planes.

The sensing circuits of FIG. 5 are also arranged in folded planes corresponding to the folded inhibit planes, but the orientation of such circuits with respect to the inhibit circuits and the memory submodules is different from the orientation of the inhibit circuits. As previously noted, separate sensing circuits are provided for the A and B halves of the memory in each digit plane. Within each of the A and B halves of the memory, however, the sensing circuit is further divided into two parts so that one part, for example, links all of the submodules *d* in the memory Modules 1 through 4. This illustrative portion is the circuit lead connected in series between terminals 68 and 69 in FIG. 5. It can be seen in that figure that the lead passes back and forth through the sheets of the submodules *d* extending downward through the memory until at the bottom it is connected by a lead portion 70 to the adjacent half of the folded digit plane. The lead then extends upwardly through the sheets to the terminal 69. A similar folded sense plane circuit is connected between terminals 71 and 72 for the submodules *c* of all four modules of the memory.

The terminals 68 and 69 are each connected to one of the primary winding terminals of a different one of two transformers 73 and 76. The terminals 71 and 72 are similarly connected to the remaining primary winding terminals of those transformers. The two transformers have their secondary windings connected in series across the input of gate 23. This arrangement of two sense circuit portions coupled through separate transformer primary windings to series connected secondary windings for driving gate 23 is an equalization technique of the type disclosed and claimed in the copending application of P. A. Harding and E. H. Siegel, Jr., Ser. No. 250,559, filed Jan. 10, 1963, now Patent No. 3,339,187. The transformer windings are polarized, as indicated by the dots adjacent thereto, so that signals generated at corresponding locations along the two illustrated sensing circuits produce signals of the same polarity at terminal pairs 68, 69 and 71, 72, respectively; but those signals appear with opposite polarities at the input to gate 23. Similar folded sense plane connections are provided, although not shown for other folded digit planes in the A half of the memory and in the B half of the memory.

Within each sensing circuit there are two circuit portions in each of the memory X planes. Those two circuit portions for a given X plane are in different halves of a folded sensing circuit and they are linked through their respective columns of holes in that X plane to different ones of the two X circuits of such X plane. This is shown more clearly in FIGS. 7 and 8.

Summarizing with respect to FIGS. 1 through 5, the total noise potential of the three-dimensional memory 10 in accordance with the present invention is fractioned so that noise voltages actually generated in selected sensing circuits are much smaller than in memories of similar capacity that use prior art circuit techniques. Each Y drive circuit links only half of a full Y plane, and the Y circuit parts within that half plane are slipped with respect to one another. Each sensing circuit is coupled to only half of a full X-plane dimension and is so arranged that it links only one of the slipped parts of each Y circuit.

Furthermore, if one considers word locations rather than just row locations in a memory, it will be noted that each folded sensing circuit links two columns of holes in an X plane; but only one of those two columns is half-selected by an X drive pulse at any one time. Memory intercycle time guard space requirements are reduced because the inhibit circuits are arranged to link only half of the sheet holes that are also linked by selected sensing circuits.

In addition to the noise reduction hereinbefore outlined, the circuit techniques utilized to achieve such noise reduction require a substantially lower number of access switches than are required if prior art memory wiring techniques are used. Accordingly, the invention realizes a considerable saving in hardware expense in the construction of a memory and at the same time improves signal-to-noise ratio in the output by accomplishing significant noise reductions. All of the features described so far are useful in ferrite sheet memories as well as in memories using other types of storage devices.

Figure 6:
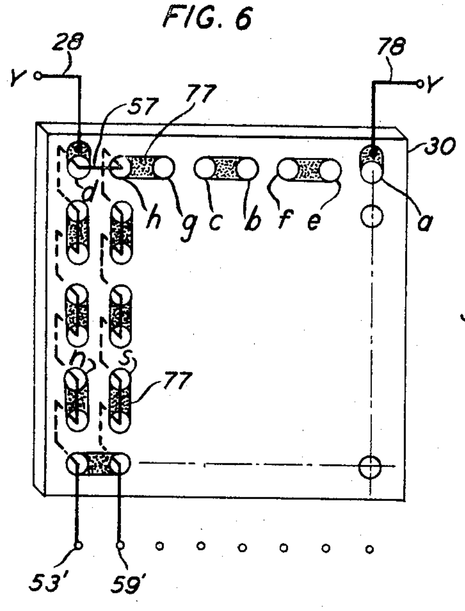
FIGS. 6 through 8 illustrate the relationship of the wiring of FIGS. 3 through 5 to an apertured ferrite sheet of a type which may be employed for information storage in the memory of the invention.
Figure 7:
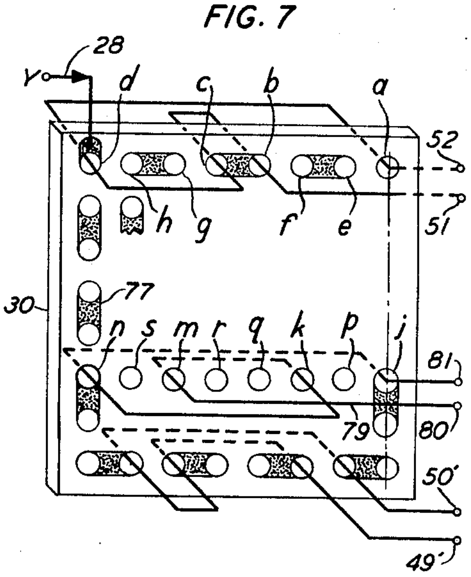
Figure 8:
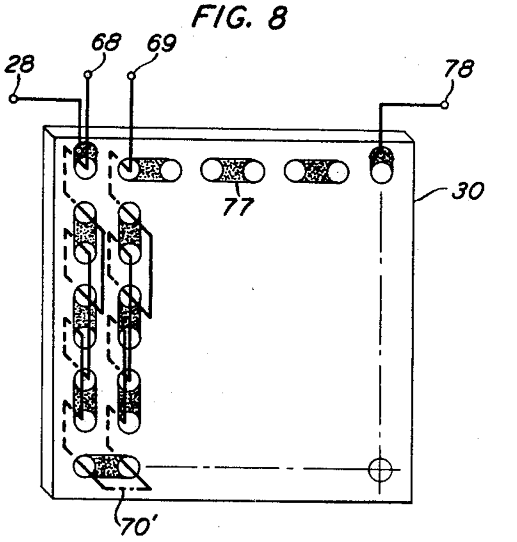

FIGS. 6 through 8 depict a typical ferrite sheet of the type that may be used in the memory described herein, and may be considered, for example, to represent the sheet 30 shown in FIGS. 2 through 5. Although only one sheet is shown, it is to be understood that each circuit, except the Y circuit, extends, in the patterns indicated in FIGS. 6 through 8, through sheet stacks as shown in FIGS. 2 through 5. The illustration in the FIGS. 6 through 8 is considerably enlarged in order to display clearly sufficient detail to convey a complete understanding of the invention. In one example of a memory that has actually been operated, a typical ferrite sheet was approximately one inch square, .03 inch thick, and included 256 holes in a 16 x 16-hole array. In FIGS. 6 through 8 a sheet with only an 8 x 8-hole array is shown and only a few of those holes are actually shown to avoid unnecessary complication of the drawing.

The plated Y circuit in FIGS. 6 through 8 is connected to the terminal 28, the same as in FIG. 2, and extends by means of a plated conductor 77 in a straightforward in-out weave down the first column of holes on the left-hand side of the sheet, and up the second column of holes. It continues throughout the rest of the sheet in the same manner. The circuit end is brought out at a terminal 78 which, in the case of sheet 30, is then connected to the plated circuit of sheet 31 in FIG. 2.

Also shown in FIG. 6 on the sheet 30 is the pattern of the folded inhibit circuit. The ends of the illustrated circuit in FIG. 6 are shown connected to terminals 53' and 59' and would, if sheet 30 were replaced in its proper position in FIG. 4, extend downward through an additional sheet in Module 2 of the memory to terminate at the terminals 53 and 59. Similar patterns of inhibit circuits are also used in adjacent pairs of Y-plane hole columns all the way across the sheet 30 as previously discussed in connection with FIG. 4.

I FIG. 7 the same sheet 30 is illustrated, but this time the two different types of re-entrant X circuits are shown in addition to the Y circuit. The circuit connected to terminals 50' and 49' is actually shown in FIG. 7 in a different X plane of the memory than is the circuit connected to terminals 51 and 52. This was done to separate the two circuits so that the wiring pattern of each might be clearly understood. It can be seen from FIG. 7, however, that the circuit connected to terminals 50' and 49' would have a counterpart in the same X plane with the circuit connected to terminals 51 and 52 so that two such X circuits for the single plane would link all holes in the upper row of sheet 30 as well as the holes in corresponding sheets which are stacked in alignment with sheet 30. Thus, in the illustrated row of the sheet of FIG. 7 which has eight holes per row, two words may be stored. The first word would have its bits stored in the magnetic material defining the holes *a*, *b*, *c*, and *d*. The bits of the second word stored in the same row would be interleaved with those of the first word and would reside in the magnetic material defining the holes *e*, *f*, *g*, and *h*. Comparing FIGS. 6 and 7 it will be seen, for example, that the holes *d* and *h* are linked by different ones of the two X plane circuits in the plane of the winding connected to terminals 51–52. Holes *d* and *h* are also linked by different halves of the same inhibit circuit which is illustrated in FIG. 6. Thus, if it is desired to write a word into the holes *a–b–c–d* an inhibit pulse applied to the circuit connected to terminals 53'–59' in FIG. 6 would have the desired inhibiting effect upon hole *d* but would not appreciably affect information stored in the magnetic material defining hole *h*.

Flux spreading can be a problem in some drive arrangements for ferrite sheet memories. Analysis of the sheets employed in one memory revealed that a net field intensity which was greater than the critical switching field intensity, i.e., half-select intensity, for the magnetic material within a flux path linking two adjacent holes on a sheet could switch flux around both holes. In other words, a net field intensity corresponding to a drive current that is larger than a half-select current can initiate irreversible flux switching. If such switching takes place in a path enclosing more than one hole in a sheet, the hole defining areas can no longer be treated as individual bistable magnetic storage devices; and error signal conditions are generated. Accordingly, the generation of such a field intensity around a two-hole path was to be avoided.

In the present memory, the winding pattern of the printed Y circuit is the basic factor upon which all other memory winding patterns must be based. Thus, each X lead at a particular hole must convey X drive pulses thereto with the same sense that the plated circuit conveys Y drive pulses thereto in order to be able to generate the full select field intensity. In the sheets illustrated herein the plated Y circuit follows an in-out weave pattern, and adjacent full-selected holes receive magnetomotive forces of opposite polarity with respect to the sheet. Furthermore, the inhibit circuit must convey drive pulses to each hole with a sense which is opposite to that of the X and Y circuits in the same hole in order that the inhibit function may be carried out properly during a memory write-in operation. Thus, the inhibit pulse tends to reduce one of the opposed full-select magnetomotive forces that may appear in adjacent holes along any row or column. These three drive currents, X, Y, and inhibit, must be considered in conjunction with pairs of holes to determine whether flux generated at one hole can spread and embrace the other or each flux is locked into its respective single-hole path. There are many non-flux-locking wiring schemes, and one of these is shown in an X circuit 79 which is connected to terminals 80 and 81 in FIG. 7.

In FIG. 7, the third row of holes from the bottom of the sheet includes holes *j*, *k*, *m*, *n*, *p*, *q*, *r*, and *s*. The circuit 79 links the holes *j*, *k*, *m*, and *n* which are in the same Y-plane columns of holes with the holes *a*, *f*, *g*, and *d*, respectively. Circuit 79 is included in FIG. 7 for purposes of illustration; it would not normally be included in the same memory unit with the other circuits illustrated in FIG. 7. The holes *s* and *m*, for example, may be considered to be a pair of adjacent, or neighbor, sheet holes. A neighbor hole in an orthogonal matrix array is the nearest hole in the same row or column of the array. Holes *s* and *m* are linked by different inhibit circuits as can be seen by reference to FIG. 6. The hole *s* is linked by the inhibit circuit connected to terminals 53' and 59' while the hole *m* is linked by a different inhibit circuit, not shown, that is completely independent of the inhibit circuit linking hole *s*. Thus, inhibit current can flow through *s* and not *m*.

It is assumed in FIG. 7 that Y current flows in at terminal 28 toward sheet 30, and X current flows in at terminal 81. Y current then flows into the plane of the drawing at hole *s*, and out of the drawing, toward an observer, from hole *m*. Hole *s* is half selected because it receives no X-drive current. Hole *m* is full selected because it receives both X and Y drive current. In the absence of inhibit current in either hole, the net magnetomotive force enclosed by a flux path around both holes is only of half-select magnitude because the forces generated at each hole are of opposite sense. Consequently, the flux generated at each hole is locked in and there is no spread between holes. However, the application of inhibit current at terminals 53' and 59' negates the effect of the Y-drive current at hole *s* without affecting hole *m*. Now the net force enclosed by a flux path around both holes is of full-select magnitude, i.e., twice the critical field intensity magnitude. Consequently, the full-select force switches flux around both of the holes *s* and *m*, and the flux field begins to spread. This spread is further aided by the net half-select current, i.e., *X* plus *Y* minus inhibit, flowing through hole *n* in a non-flux-locking direction.

If a similar determination is made for any pair of holes in the top row of sheet 30 in FIG. 7, it will be found that there is no pair of neighbor holes that can be linked by a path enclosing more than a half-select magnetomotive force. Consequently, the flux is locked in at its originating hole location. The reason for the flux locking can be stated as a theorem for applying windings to ferrite sheet magnetic memories. Thus, in order to achieve flux locking for a full selected hole in a sheet, all neighbor holes must also be full selected in opposite sense unless they are linked by the same inhibit wire as is the first-mentioned full selected hole. Neighbor holes on the same inhibit wire benefit from the necessary cancellation of effects of the Y and inhibit currents. The influence of the nearest diagonal hole is negligible, compared to the influence of neighbor holes on the same row and column, because the reluctance of the longer path length to a diagonal hole is too great for magnetomotive forces normally received for efficient memory operation. Accordingly, in the memory of the present invention, the magnetic flux circling a hole is in effect locked into its one-hole path and can never extend beyond that region to encompass an additional hole during any of the normal coincident current memory operations.

In FIG. 8 the same memory sheet 30 is illustrated together with a portion of a sensing circuit winding. This winding is connected between terminals 68 and 69, the same as in FIG. 5. The lower winding portion 70', which interconnects the sensing circuit parts in the two left-hand columns of holes in sheet 30, is shown in dotted form because it represents schematically the three additional sheets below sheet 30 in Modules 2, 3, and 4 of the memory, as well as the crossover connection 70 for the folded plane, as illustrated in FIG. 5. This sensing circuit in FIG. 8 does not utilize the conventional in-out weave which characterizes the Y and inhibit circuits. It employs instead a skipping in-out weave, or complementary wiring, pattern of the type disclosed in my copending application Ser. No. 179,870, filed Mar. 15, 1962, now United States Patent 3,284,784, which isued Nov. 8, 1966. As indicated in that application, this complementing wiring pattern reduces the transmission line distortion for its inhibit drive circuit pulses. However, in addition, the same wiring pattern also has the effect of improving local noise cancellation of shuttle noises coupled from the Y drive circuit to the sensing circuit.

It is known in magnetic memories to arrange the sensing circuit so that shuttle noise coupled thereto from one half of the selected holes on a memory drive circuit is of opposite polarity with respect to shuttle noise coupled from another half on the same drive circuit. However, the cancellation is usually imperfect because the hysteresis characteristic of the magnetic material is not perfectly rectangular, and noise pulses may initially have different magnitudes. The noise from any one memory location may also be badly distorted by transmission line effects before it reaches a location where it is to be offset by another noise pulse. Accordingly, the shuttle noises accumulate along the sensing circuit of prior art memory systems. However, by utilizing a complementing wiring scheme as disclosed in my last-mentioned application, successively larger groups of cancellation hole pairs are opposed to one another so that the remanent effect of one hole pair is offset against the similar effect of another hole pair. The net remanent effect of a group comprising two such hole pairs is in turn offset against the net remanent noise from a similar group of holes. This pairing and grouping is continued in ever increasing size to the limit of the size of the memory. The combination of such complementing wiring with the divided and interlocked operating circuits disclosed herein improves on the basic efficacy of either arrangement alone.

Comparing FIGS. 7 and 8 it will be seen that, within any one row of holes in an X plane in the sheet 30, any pair of holes which are linked by the same sensing circuit are linked by different ones of the X plane circuits, respectively, which are coupled to that same row. Since only one of the two X plane circuits of any plane is activated at any one time, there can be no ambiguity in the read-out because each folded sense circuit is coupled to only one full selected hole in any given row of a ferrite sheet.

In summary, the drive circuits of a three-dimensional memory are, in accordance with the present invention, divided and subdivided in different directions. In addition, the memory sensing circuit is divided in one direction. The result of this arrangement is that only a small fraction of the total noise potential of the memory ever reaches the sensing circuit. The use of complementary wiring in the sensing circuit radically reduces the magnitude of the limited amount of noise which is coupled to the sensing circuit. Thus, the divided parts of each of the memory circuits are so interlocked with one another that the resulting noise in the sensing circuit is the noise of only a small memory even though the information storing capacity of the memory is quite large. In addition, the circuitry required for gaining access to these divided memory circuits is much less extensive and less costly than is ordinarily required for a prior art memory of the same capacity. The orthogonally divided sensing and inhibit circuits reduce inhibit noise coupled to the sensing circuit and thereby permit compression of memory cycle time.

Figure 9:
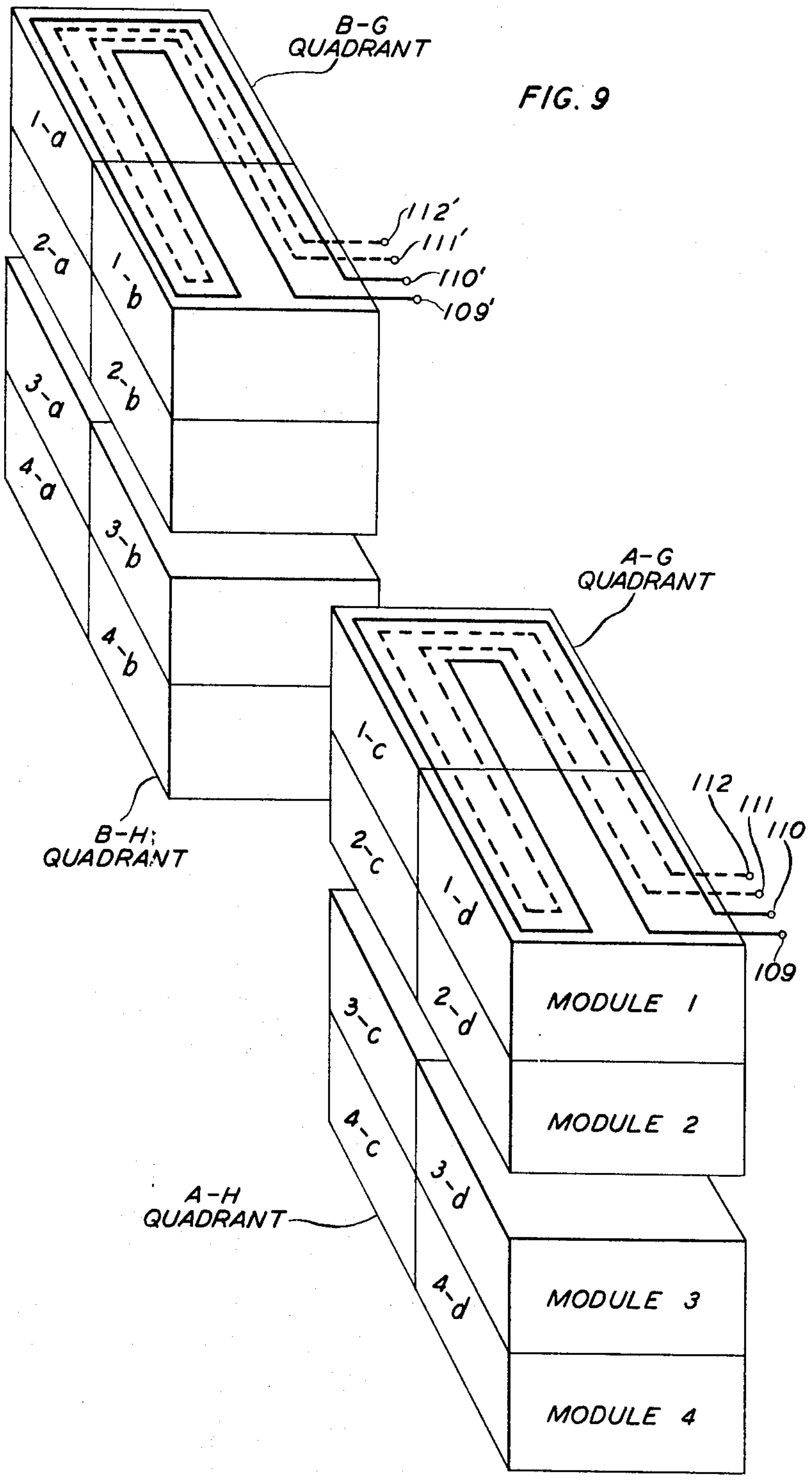
FIG. 9 is a modified arrangement of the X-plane wiring.
Figure 10:
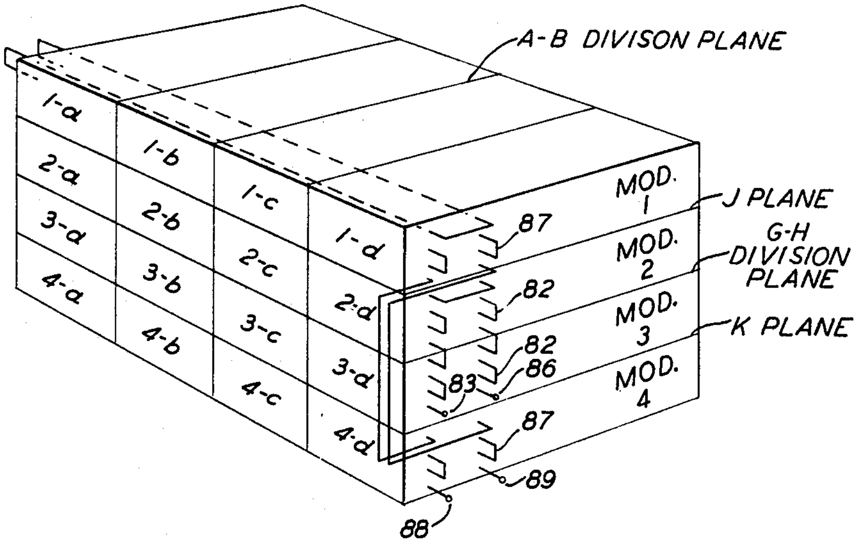
FIG. 10 is a modified arrangement of the digit plane inhibit wiring.

FIGS. 9 and 10 are partial diagrams illustrating two additional modifications of the invention. These figures are modified forms of the X-plane and inhibit windings illustrated in FIGS. 3 and 4, respectively. They demonstrate additional embodiments for utilizing the principles of the invention.

In FIG. 9 the X-plane circuits are divided at the A–B division plane to achieve further sensing circuit noise reduction. Thus, in the top plane of the memory, circuits 109 through 112 link the A half and circuits 109' through 112' link the B half. To achieve operation with this new division it is necessary only to add two more selector switches plus access diodes and transformers as will be described, for selecting an X circuit in one of the four quadrants of the memory. The same row and column access switches are utilized as previously noted in connection with the Corbella et al. patent. Now in any given X plane, a circuit in only one of the A or B halves is actuated, and the number of common linkages between an activated X circuit and an activated inhibit circuit is halved. This improves the amplitude stability of the X drive pulses as will be described. The same result can, of course, be achieved, without even increasing access diodes and transformers, by slipping X-plane parts so that each part is linked by a different part of the inhibit circuit. For example, considering FIGS. 4 and 9 together, each X circuit in submodules 1–*c* and 1–*d* is connected (by leads not shown) to a corresponding X circuit in submodules 3–*a* and 3–*b* on the opposite side of the A–B division plane and the G–H division plane.

An inhibit signal is advantageously a half-select signal which is applied in the read direction during a write-in time. The inhibit signal fixes a certain flux density level in each device to which it is applied. That level is different for binary ONES and ZEROS stored in such devices and is different from the level which would prevail in a device in the absence of an inhibit signal. Each different flux density level in a device causes the device to present a correspondingly different amount of loading to the X and Y drivers to which such device may also be coupled. These different loads cause different amounts of X and Y drive current to be drawn with the result that the ultimate flux density established in magnetic devices into which information is being written suffers corresponding changes, and the subsequent read-out signals from such devices are likewise of various magnitudes. The read-out variations require a much larger ONE-ZERO discrimination margin than would otherwise be needed. However, the X-circuit division illustrated in FIG. 9 approximately halves the number of half-selected X-plane holes, as compared to FIG. 3, which can also be linked by an energized inhibit circuit such as is shown in FIG. 4. The result is a significant reduction in the amount of output signal variation that had heretofore been caused by load variations due to the presence or absence of inhibit signals.

Figure 9A:
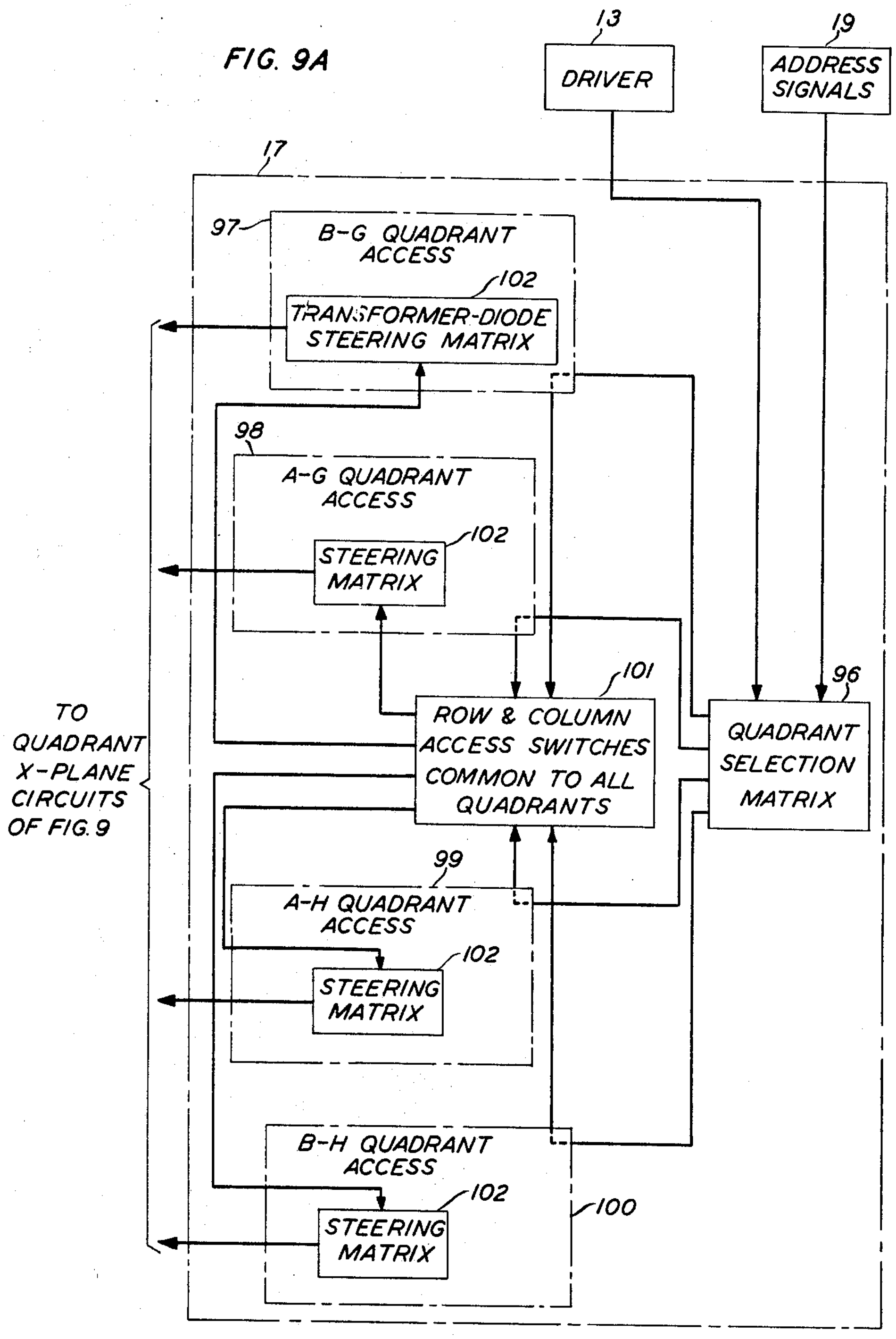
FIG. 9A is a block and line diagram illustrating the functions and internal arrangement of one form of the address translation and access circuits shown in FIG. 1.

FIG. 9A is a simplified diagram indicating in block-and-line form the manner in which the previously mentioned Corbella et al. patent is employed in connection with X translation and access circuits 17 for the divided X-plane drive circuits of FIG. 9. Driver 13 supplies regularly occurring pulses to a quadrant selection matrix 96 which includes access switches that are responsive to address signals supplied via source 19 for routing the pulses to the quadrant of memory 10 in which the selected word is located. Matrix 96 steers the pulses to one of the quadrant access circuits 97, 98, 99, or 100 for the quadrants B–G, A–G, A–H, or B–H, respectively. The letter designations for the quadrants indicate the quadrant location with respect to the memory division planes. For example, the B–G quadrant is located on the B side of the A–B division plane and on the G side of the G–H plane.

Each quadrant access circuit includes a transformer-diode steering matrix 102 routing drive pulses to selectable quadrant addresses for performing read and write operations. Each quadrant has its own steering matrix 102 of relatively inexpensive passive transformers and diodes, but the addresses defined by each matrix are identical for all four of the access circuits 97–100. A common set 101 of the active, and relatively expensive, row and column access switches serves the identical addresses of all four access circuits. The drive pulses are, therefore, routed to the steering matrix 102 of the selected quadrant access circuit through the switch set 101.

Output leads extend from each of the access circuits 97–100 to the various X circuits of their respective quadrants in FIG. 9. As a result of the cooperative action of switch set 101 with an access circuit matrix, one output lead from only the selected quadrant access circuit is activated at a time.

The Y address translation and access circuits 18 are arranged, and operate, in a manner similar to that illustrated in FIG. 9A for circuits 17. However, only two access circuits, such as circuits 97–100, are required in the circuits 18 because in the embodiments illustrated herein the Y circuits are divided into only two parts, the G and H parts. A similar arrangement is also used for the translation and access circuits 17 that are used with the X circuits shown in FIG. 3.

FIG. 10 illustrates a modified inhibit circuit division in accordance with the invention. In this embodiment the G–H division plane is employed as before for the X and Y circuits, but the inhibit circuit is divided with respect to two additional division planes J and K. Planes J and K are parallel to the G–H plane and perpendicular to the A–B plane. Plane J extends between Modules 1 and 2, and plane K extends between Modules 3 and 4.

The inhibit circuit is divided into two parts for each folded digit plane. A first part 82 extends between terminals 83 and 86 in the folded digit plane part in Modules 2 and 3. A second part 87 extends between terminals 88 and 89 in the folded digit plane part in Modules 1 and 4. Both parts of the inhibit circuit link both the A and B halves of the memory. This arrangement reduces the common linkages between any activated X or Y circuit and an activated inhibit circuit, and thereby reduces the load variations on the Y drive generator with the resulting amplitude stabilizing effects previously discussed in connection with the X and inhibit circuits. Thus, for example, a word in submodule 1–*d* is selected by energizing a Y circuit that links submodules 1–*d* and 2–*b* as previously discussed in relation to FIG. 2. During write-in for a ZERO inhibit signals are applied to circuit 87 which links only the one submodule 1–*d* of the two that are linked by the activated Y circuit.

Additional noise reduction by still further drive pulse stabilization can be realized with inhibit circuit arrangements of the type shown in FIG. 10. The circuits described so far still are subject to some drive pulse amplitude uncertainty because there is no convenient way to predict which digit planes will be activated by inhibit signals during a particular write-in operation. This difficulty is overcome by combining the circuits of FIG. 10 with a feature of the inhibit address translation and access circuits 21 which is disclosed and claimed in my previously mentioned application Ser. No. 294,506. In that application it was shown that all digit plane inhibit circuits could be driven in series from a single source by utilizing control gates that are operated jointly by drive signals, address and data information, and clock signals to substitute an equivalent impedance in the series drive connection for any digit plane where a binary ONE is to be written. In accordance with the present invention the two inhibit circuit parts 82 and 87 of any digit plane are connected to be equivalent impedances for one another in the manner shown in simplified form in FIG. 11.

Thus, to write a ZERO in submodule 1–*d* in the illustrated digit plane of FIG. 10, circuit 87 is connected to receive the inhibit pulse for that plane from the single drive pulse generator 20 via a control gate 90. The latter gate, and the other control gates 91, 92, and 93, are coincidence gates operated as EXCLUSIVE OR logic for each digit plane. The gates are responsive to inhibit signals from driver 20 and to clock and data signals from the address signal source 19. Source 19 couples clock signals through from clock source 11 and employs a data register 96 to respond to address information from the program control 12 for addressing control gates to direct bit information to correct memory digit planes. A second digit plane is indicated by the windings 82' and 87' in FIG. 11 and is similarly controlled by the gates 92 and 93. The common linkages for the selected inhibit and Y circuits are those in only submodule 1–*d* if the slipped Y circuits of FIG. 2 are employed.

However, when writing a ONE in the same location in submodule 1–*d* and with the same circuit arrangements, the inhibit circuit 82, instead of circuit 87, is connected by gate 91 to receive the inhibit pulse for the plane from the single inhibit drive pulse generator. Now the common linkages with the inhibit circuit are in submodule 2–*b* for the selected Y circuit, but no inhibit signal is applied to the selected bit location. Consequently, the loading imposed on the Y driver by inhibit circuit action is the same for writing both a ONE and a ZERO and the resulting stored flux density conditions conform more closely to their respective theoretical levels. In order to write a ONE or ZERO in a location linked by circuit 82, circuits 87 and 82 are pulsed by gates 90 and 91, respectively. Similar stabilizing benefits are realized for the X driver if the slipped X-plane arrangement discussed in connection with FIG. 9 is utilized instead of the divided X-plane arrangements wtih no slipping.

Coincident current memories have an additional delta noise problem which is of some importance in spite of the best efforts to eliminate delta noise effects. A considerable amount of noise of that type can reach the memory sensing circuits as a result of the uncertainty of occurrence of an inhibit pulse in the digit plane circuits. The half-select noise generated at any hole in a sheet memory can have different magnitudes for any stored bits depending upon whether or not the particular hole received an inhibit pulse during the previous memory cycle. This type of delta noise in a digit plane sensing, or read, circuit is of particular significance for certain information storage sequences in a memory. Although such sequences may not occur frequently, it is necessary nevertheless in certain applications of ferrite sheet memories to eliminate the potentially large noise which can occur in the event that such a relatively remote possibility should become a reality.

It is known in ferrite sheet memories that the sense of the inhibit circuit with respect to the read circuit varies from hole to hole throughout the pierced sheet memory. Thus, in order to reduce half-select noise these two circuits link one device in an aiding sense while they link another device in a bucking sense with respect to one another. Furthermore, since the inhibit circuit in any hole of the memory must always be oriented with respect to the X and Y drive circuits in the same hole so that the inhibit circuit can supply read-polarity inhibit pulses, the X and Y circuit sense with respect to the read circuit must also change from hole to hole throughout the memory. In a three-dimensional sheet memory the sheets are stacked; and in those memories wherein a Y circuit is plated on the sheets, the X, inhibit, and read circuits necessarily run parallel to one another within the stacks of sheets.

It is usual that along any given X wire in a column of holes in a digit plane the read wire in the same column of holes has the same sense within the minimum submodule stack size. However, in accordance with my aforementioned application Ser. No. 179,870, the association of X circuit and read circuit segments differs among the columns of holes just as it does among the inhibit leads which are also in the same holes. Consequently, the X circuit portions and the read circuit portions which are in any given relative sense are scattered across the digit plane. It is, therefore, not an easy matter to visualize what sort of information patterns in the digit plane can generate large noise conditions. For this reason, it is convenient to illustrate a segment of a digit plane in symbolic form with all of the X circuit portions of a given relative sense with respect to the read circuit in a submodule section of the digit plane grouped together.

Figure 12:
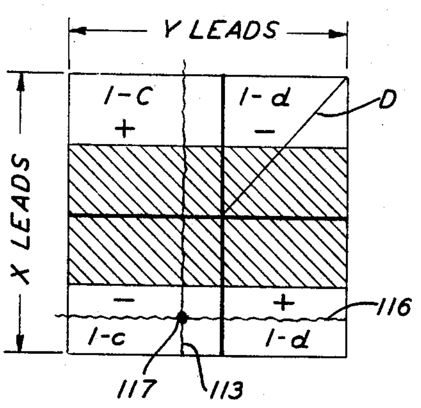
FIGS. 12 through 15 are diagrams illustrating further advantageous modifications of the invention.
Figure 13:
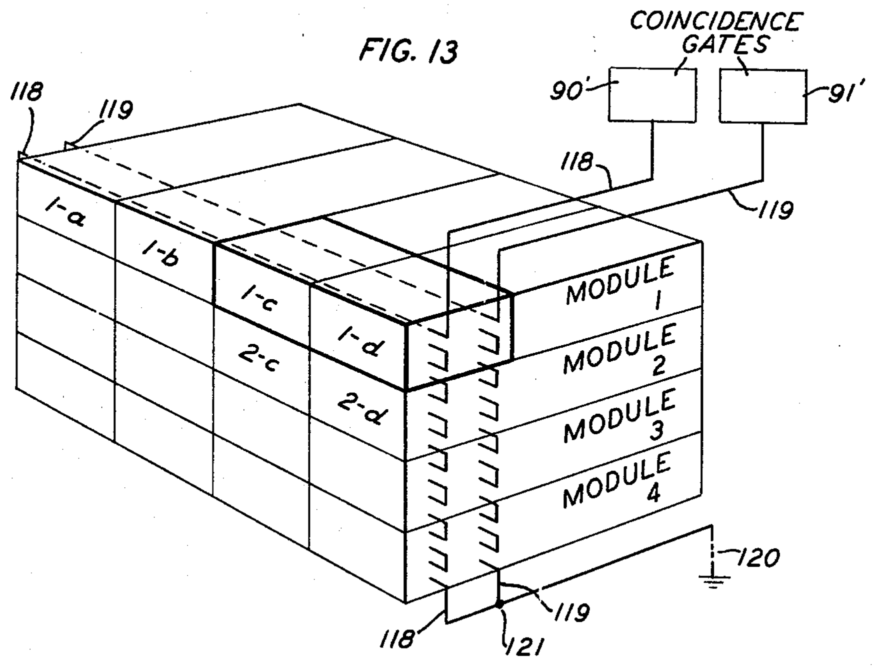

FIG. 12 represents a symbolic digit plane of the aforementioned type wherein the X circuits are grouped. The digit plane segment of FIG. 12 is for the submodules 1–*c* and 1–*d* in the extreme left-hand digit plane of the memory as illustrated in the FIGS. 2 through 5, for example, and as also illustrated in FIG. 13. The folded digit plane segment of FIG. 13 which is represented in FIG. 12 is outlined in broad lines in FIG. 13. As shown in FIG. 12, the Y circuit portions are the vertical circuits and the X circuit portions are the horizontal circuits. One of each of these X and Y circuits is schematically shown in FIG. 12 as a wavy line extending through two submodules. However, it must be recalled that in the two submodules illustrated in FIG. 12 there are many Y and X leads.

The relationships of the groups of X circuits with respect to corresponding read circuits is indicated in FIG. 12 by the polarity signs in each of the submodule segments of the digit plane. A plus sign is employed to indicate circuit portions that are so oriented as to produce positive sensing circuit voltages at the gate 23 in FIG. 5 as a result of read half-select signals in the corresponding X circuits. The minus signs indicate negative read circuit voltages resulting from X circuit read half-select signals. Broad quadrant division lines in FIG. 12 indicate the division of each of the two submodules into a plus and a minus section. Thus, in submodule 1–*c* and X circuit extends from left to right across the submodule and also extends similarly through submodule 1–*d*. This X circuit portion has an aiding, or positive, relationship with respect to corresponding read circuit portions in submodules 1–*c* and 1–*d*. However, in consequence of the arrangement shown in FIG. 5 for coupling sensing circuit portions in the submodules 1–*c* and 1–*d* through transformers to a gate 23, the same X circuits produce at the input to the gate to which both sensing circuit portions are coupled positive signals from submodule 1–*d* and negative signals from submodule 1–*c*, as indicated by the polarity signs in those submodules in FIG. 12.

It will be noted in FIG. 12 that a portion of each of the submodule segments of the digit plane has been crosshatched. This crosshatching represents a further symbolic liberty which has been taken in the schematic representation of FIG. 12 and indicates that for purposes of illustration the inhibit circuit portions in each half of a folded digit plane have been grouped together, respectively. The X circuits in the crosshatched portions are those which lie in alternate, or odd, inhibit plane circuits, while the remaining X circuits lie in the intermediate, or even, inhibit circuit planes. Thus, the schematic diagram of FIG. 12 represents the relationships of all of the circuits of a folded digit plane segment rearranged into a two-dimensional diagram.

Assuming first that FIG. 12 includes an inhibit circuit as shown in FIG. 4, a typical storage sequence which causes a large noise will be described. Within a digit plane inhibit circuit a binary ZERO which is written in any hole location in the plane causes the flux density in all nonselected holes to be walked down in the read direction. If subsequent to the write-in of that ZERO a binary ONE is written in succession in each of the holes along a diagonal line D across the minus quadrant of FIG. 12 in submodule 1–*d*, all of the half-selected holes in the illustrated digit plane in the plus portions of submodules 1–*c* and 1–*d*, and in the mentioned minus part of submodule 1–*d* are walked up to a higher flux density level in the write direction. These operations have established a "worst noise" pattern in the digit plane. If, now, read-out signals are applied to the Y lead 113 and the X lead 116 to interrogate the hole 117 in the minus part of submodule 1–*c* of FIG. 12, the read circuit for the digit plane receives a noise voltage signal from all of the half-selected holes along the leads 113 and 116.

The sensing circuit receives negative half-select noises from the portions of the leads 113 and 116 which are in the negative part of submodule 1–*c*, and these noises are generated at holes which, as previously mentioned, had been walked down to a low flux density condition regardless of whether they stored ONES or ZEROS. The read circuit also receives positive noise voltages from the portions of the same two X and Y circuits in the plus parts of submodules 1–*c* and 1–*d*, and those noise voltages are produced in holes which had previously been walked up to a high flux density level for ONES and ZEROS as previously described. Thus, within the sensing circuit the high positive noises are being offset against low negative noises so that imperfect noise cancellation must result and a significant magnitude of noise remains in the sensing circuit.

In accordance with the present invention, however, the aforementioned large remanent sensing circuit noise is reduced by utilizing the inhibit circuit arrangement illustrated in FIG. 13. Here the inhibit circuit portions in each half of each digit plane are electrically separate circuits and corresponding ones of such separate circuits in each module are connected in series through the G and H halves of the memory to form a single inhibit circuit for each half of the folded digit plane. Thus, in FIG. 13 the inhibit circuit 118 is electrically separate from the inhibit circuit 119 and each extends through all four modules of the memory in the two halves of the single folded digit plane illustrated in FIGS. 4 and 5. The Y, X, and sensing circuits utilized in the memory of FIG. 13 are advantageously those shown in FIGS. 2, 3, and 5, respectively. However, in accordance with this modification of the invention, the inhibit plane circuit 118 is connected between the output of a coincidence gate 90' and ground while the inhibit plane circuit 119 is connected between the output of a coincidence gate 91' and ground.

Figure 11:
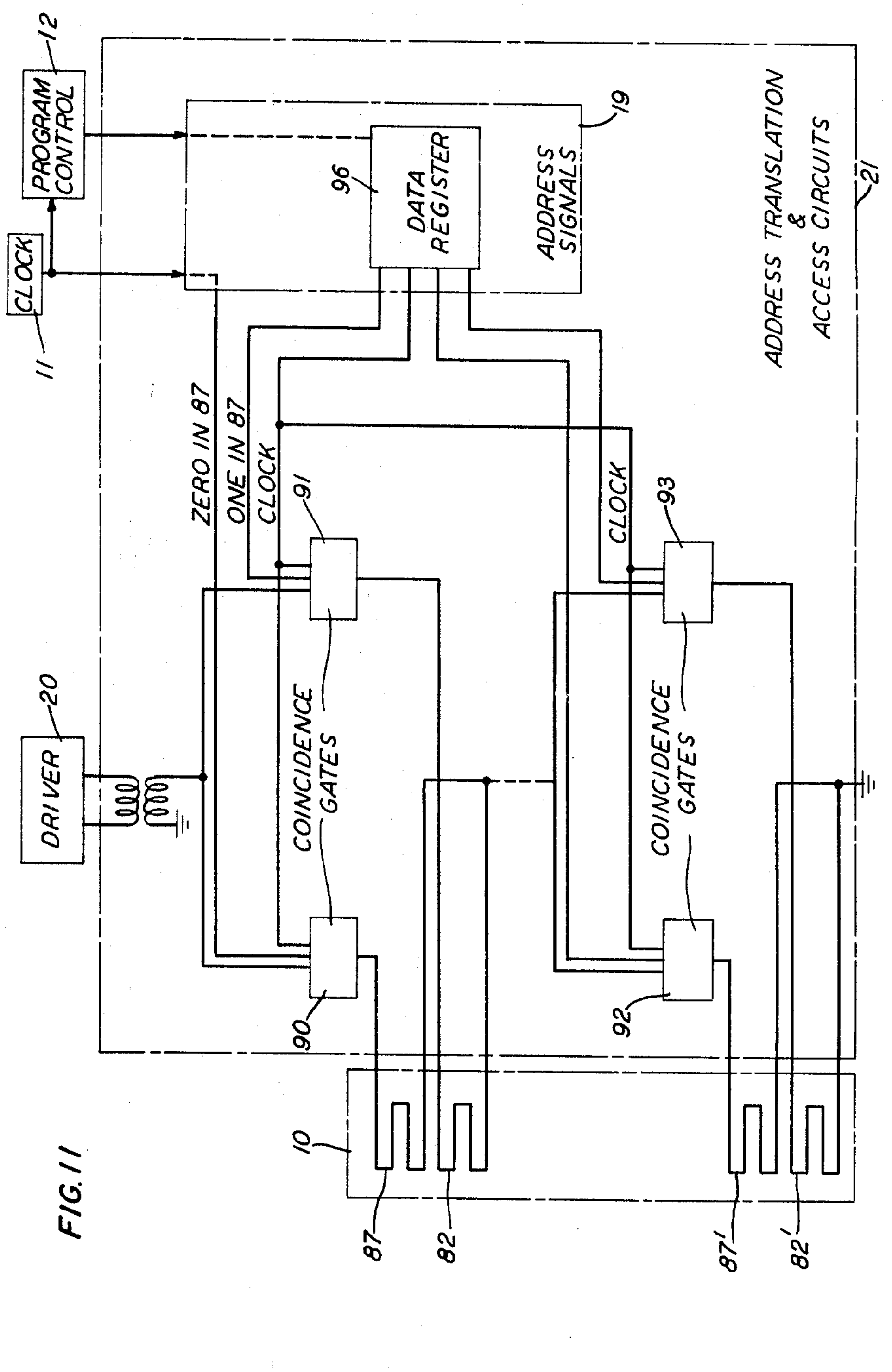
FIG. 11 is a block and line diagram illustrating the functions and internal arrangement of another form of address translation and access circuits.

The gates 90' and 91' correspond to the gates 90 and 91 illustrated in FIG. 11 and are connected in a similar address translation and access circuit, not shown in FIG. 13. The dotted lead portion 120 in FIG. 13 schematically indicates a series connection between the common junction 121 and ground of similar digit plane inhibit circuits for other digit planes of the memory. The remainder of the address translation and access circuits for the illustrated digit plane, as well as for those digit planes not shown, are not presented in FIG. 13 since they correspond to that shown in FIG. 11. It is sufficient to indicate at this point that such circuits are employed as described in FIG. 11 to perform an EXCLUSIVE OR function for each digit plane so that during each write-in interval of memory operation an inhibit pulse is applied to one or the other of the inhibit circuits 118 or 119 in the respective halves of the folded digit plane illustrated in FIG. 13. Thus, if a ZERO is to be written in a memory location linked by circuit 118 the inhibit pulse is applied to circuit 118 only. If a ONE is to be written in that same location, the inhibit pulse is applied to the inhibit circuit 119 only. The same inhibit pulse operations are employed for writing ZEROS and ONES, respectively, in locations linked by the inhibit circuit 119.

Now, keeping in mind the EXCLUSIVE OR inhibit drive arrangement shown in FIG. 13, the worst noise pattern previously described in connection with FIG. 12 is re-evaluated. In this case a ZERO written in any location in the folded digit plane causes only half of the memory locations to receive an inhibit pulse and only half of the locations are therefore placed in a low flux density condition. Thus, if it is assumed that the ZERO was written at the hole 117, the uncrosshatched submodule portions in FIG. 12 receive the inhibit signal and the crosshatched portions receive no inhibit signal. Next, a binary ONE is written in any combination of hole locations of the folded digit plane, e.g., along the same diagonal D of the negative section of submodule 1–*d*. All crosshatched portions of FIG. 12 receive an inhibit pulse when the ONE is being written in the uncrosshatched portions of the negative part of submodule 1–*d*, and the uncrosshatched portions receive the inhibit signal when the ONE is being written in the crosshatched portions of the negative part of submodule 1–*d*.

Thus, during the last-described write-in sequence, the holes along the part of X lead 116 in submodule 1–*c* are unchanged after the ZERO write-in and remain in low flux density levels. The holes along the part of X lead 116 in submodule 1–*d* were substantially all driven to the low flux density levels when ONES were written in the negative crosshatched part of submodule 1–*d*. Accordingly, substantially all holes along lead 116 are at low levels and good noise cancellation results. Along Y lead 117 the holes in the negative part of submodule 1–*c* all end up in the low flux density levels, while in the positive part half are high and half are low. Thus, along the Y lead the resulting noise in the sensing circuit is halved, and along the X lead the sensing circuit noise is substantially eliminated. If the sequence of writing along the diagonal D is reversed, however, the noise along the X lead 116 takes the same form as that along the Y lead. Consequently, the information pattern that was a worst noise pattern when using the inhibit connection of FIG. 4 produces a much smaller remanent noise with the inhibit arrangement of FIG. 13.

Figure 14:
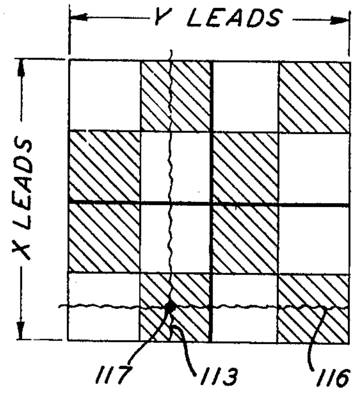
Figure 15:
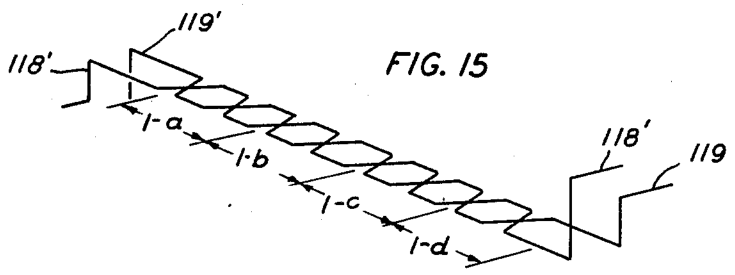

The inhibit circuit arrangement of FIG. 13 can be modified as in FIGS. 14 and 15 to produce similar results, but with reduced probability of the occurrence of a sequence of operations that will generate large sensing circuit noise. In the modified form of the invention presented in FIGS. 14 and 15, the inhibit circuits in the two halves of the folded digit plane illustrated in FIGS. 12 and 13 are cross-connected a number of times during each passage between the front and the rear of the memory so that they form a checkerboard pattern in the modified symbolic digit plane illustrated in FIG. 14. The actual physical arrangement for the inhibit circuit in the memory is illustrated in FIG. 15 for the uppermost passage of the inhibit leads 118' and 119' through the memory. Only one passage of the leads is illustrated since all other portions of each of these leads has substantially the same configuration in each of the other X planes of the memory. Thus, the leads 118' and 119' are crossed between the two halves of the folded digit plane midway in their passage through the submodule 1–*d*, and they recross back again at the boundary between the submodules 1–*d* and 1–*c*. Similar crossconnections of these two leads are accomplished in the other submodules and in the other X planes of all four submodules in each module of the memory.

In FIG. 14 the symbolic digit plane is the same as that shown in FIG. 12 except for the crossconnections of the two inhibit circuits in the plane. These crossconnections produce the checkerboard arrangement shown in FIG. 14 which represents one possible redistribution of the crosshatched and uncrosshatched portions of the symbolic plane. It is readily apparent from FIG. 14 that along either of the coordinate leads 113 or 116 each portion which is in a submodule wherein noise voltages of a given polarity are produced has half of that portion also linked by one inhibit circuit of the digit plane and the other half linked by the other inhibit circuit of the digit plane. Thus, any sequence of memory operations produces hole flux density conditions along any coordinate lead such that at least half of the holes of opposite polarities are at flux density levels that produce sensing circuit noises of substantially the same magnitude. Consequently, the previously described noise reduction advantage is, in FIG. 14, achieved along both the X and Y leads throughout the illustrated digit plane.

Although the present invention has been described in connection with particular embodiments thereof in order to illustrate the underlying inventive principles, it is to be understood that some or all these principles may be employed in different combinations and in different applications which will be apparent to those skilled in the art without departing from the spirit and scope of the invention.

What is claimed is:

1. A magnetic memory comprising a plurality of bit storage devices, said devices being divided into at least two groups, corresponding devices in each of said groups having identical device addresses within their respective groups, means providing address signals designating a particcular one of said groups and device addresses common to all of said groups, and access switching means responsive to said address signals and actuating devices in only one of said groups at a time.

2. A three-dimensional magnetic memory comprising plural binary bit storage devices which are divided into at least two groups and that are arranged in a plurality of planes, each of which planes includes devices in each of said groups, said storage devices being responsive to applied electric signals for assuming one or the other of two magnetic conditions, drive circuits applying electric signals to effect actuation of selected devices to predetermined ones of said conditions for producing output signals, a sensing circuit in each plane of said memory for receiving said output signals, each of said sensing circuits having electrically separate circuit portions for plane portions coupled to each of said groups, means applying address signals to said memory to activate certain ones of said drive circuits in accordance with said address signals, a signal discriminator for each of said planes, and gating means responsive to said address signals for coupling only one sensing circuit portion of a plane to the discriminator for such plane.

3. The magnetic memory in accordance with claim 2 in which the sensing circuit in each of said planes is coupled to the devices of such plane in a complementing noise cancellation pattern with respect to drive circuits also linking such devices.

4. The magnetic memory in accordance with claim 2 in which said drive circuits include a separate pair of drive circuits in each of said planes, each drive circuit of a pair being coupled to a portion of the devices in both of said groups, a single drive pulse generator, and means responsive to said address signals simultaneously coupling drive pulses from said generator to all addressed drive circuits of said pairs.

5. A three-dimensional magnetic memory comprising plural binary bit storage devices comprising means for storing information bits on a one-device-per-bit basis, said devices being divided into first, second, third, and fourth quadrant groups by first and second mutually perpendicular division planes, drive circuits applying signals to effect actuation of selected devices to predetermined conditions for producing output signals, a plurality of sensing circuits for receiving said output signals, each sensing circuit being coupled to devices on one side of said first plane but on both sides of said second plane.

6. The magnetic memory in accordance with claim 5 in which each of said drive circuits extends to devices in two quadrants on the same side of said second plane.

7. A three-dimensional magnetic memory comprising plural binary bit storage devices divided into first, second, third, and fourth quadrant groups by first and second mutually perpendicular division planes, drive circuits applying signals to effect actuation of selected devices to predetermined conditions for producing output signals, a plurality of sensing circuits for receiving said output signals, each sensing circuit being coupled to devices on only one side of said first plane but on both sides of said second plane, said drive circuits include first and second groups of drive circuits in planes that are parallel to said first and second division planes of said memory, respectively, and each of the drive circuits in said group that is in planes parallel to said first division plane has two circuit parts which are connected in series with one another and which are physically slipped with respect to one another so that each circuit part is on a different side of said first division plane.

8. A memory array for storing digital information and comprising storage means arranged in a three-dimensional array with mutually perpendicular first and second drive planes and digit planes, a plurality of first drive circuits coupled to said storage means in said first planes, a plurality of second drive circuits coupled to said storage means in said second planes, each of said second circuits cooperating with one of said first circuits for applying signals to actuate predetermined groups of said storage means, each of said second circuits being divided into at least two electrically separate parts whereby only a portion of the devices in a second drive plane can be actuated by any one part of the corresponding second drive circuit at one time, and sensing circuits linking the digit planes of said memory, respectively, and each divided into at least two parts whereby within a digit plane only a portion of the storage means to which a part of a second drive circuit is coupled is also linked by any one part of a sensing circuit.

9. The memory in accordance with claim 8 in which each of the second drive circuit parts includes two portions that are physically located in different ones of said second drive planes which are sensed by different ones of said sensing circuit parts in each of said digit planes.

10. The memory array in accordance with claim 8 in which each of said first drive circuits is also divided into at least two parts with each part being arranged to link in each digit plane of the memory a different portion of the devices linked by each sensing circuit part for that digit plane.

11. The memory array in accordance with claim 10 in which each of said parts of said first and second drive circuits includes at least two portions that are physically slipped to be located in different ones of the corresponding drive planes.

12. The memory array in accordance with claim 11 in which the slipped portions of such second drive circuit part are in second drive planes that are sensed by different ones of said sensing circuit parts in each of said digit planes.

13. The memory array in accordance with claim 11 which comprises in addition.

a separate inhibit circuit linking each of the digit planes of said array, and each of said inhibit circuits is divided into two parts arranged so that each part has a common storage means linkage with only a portion of each of said sensing circuit parts.

14. The memory array in accordance with claim 11 which comprises in addition a separate inhibit circuit linking each of said digit planes, and each of said inhibit circuits is divided into two parts arranged so that each part has a common storage means linkage with only one portion of each of said first drive circuit parts.

15. The memory array in accordance with claim 11 which comprises in addition a separate inhibit circuit linking each of the digit planes of said array, and each of said inhibit circuits is divided into two parts arranged so that each such part has a common storage means linkage with only one portion of each part of at least one of said first or second drive circuits.

16. The memory array in accordance with claim 8 which comprises, a plurality of third drive circuits coupled to said storage means in said digit planes for applying signals to a portion of each of said groups of storage means to inhibit the actuation of at least one storage means in such portion, each of said third drive circuits being coupled to said first and second drive circuits through storage means in the digit plane of such third drive circuit and thereby presenting to said first and second drive circuits a first load impedance in the presence of said inhibit signals and a second load impedance in the absence of said inhibit signals, each of said first, second, and third drive circuits being divided into at least two electrically separate parts, only one of which parts in each of said first, second, and third circuits is energized to apply signals to storage means at any one time, and each of said third drive circuit parts is coupled to only a portion of each of the energized parts of said first and second drive circuits and is further coupled to only a portion of each of the unenergized parts of said first and second drive circuits.

17. The memory array in accordance with claim 8 which comprises in addition, at least two inhibit circuits for each of said digit planes, each of said inhibit circuits being coupled to the storage means in a different segment of such digit plane, a source of pulses, and means coupling each pulse from said source to one or the other of said inhibit circuits in each of said digit planes.

18. A magnetic memory for storing m-bit words and comprising plural apertured sheets of ferromagnetic material and each having a plurality of holes therein in a coordinate array of rows and columns, each such sheet having an electric circuit linking all holes of the sheet, said array having an $a \times b$ hole dimension wherein $a$ and $b$ are the numbers of holes in said sheet along the respective row and column dimension of said coordinate hole array, $m$ being neither equal to, nor an integral multiple of, either $a$ or $b$, said sheets having their circuits connected to form a series circuit so that the total row hole length $r$ of the combined plural sheets is a common multiple of both $m$ and $a$ whereby a plurality $w$ of said $m$-bit words can be stored along a row of said sheets and so that $m \cdot w = q \cdot a$ where $q$ is an integer, a plurality of bit sensing circuits, each linking the corresponding hole locations in a different column of said holes to form a plurality of column circuits, means connecting in series the column circuits linking corresponding bit locations of said words to form folded plane circuits, and a plurality of additional electric circuits each linking all bit positions of a different one of said words.

19. In a magnetic memory for storing $m$-bit words in a three-dimensional array, a plurality of apertured sheets of ferromagnetic material each having plural holes arrayed in rows and columns and having an electric circuit thereon linking all holes of the sheet, said sheet having an $a \times b$ hole dimension wherein $a$ and $b$ are numbers of holes along the respective row and column hole dimensions of the array of holes, $m$ being neither equal to, nor an integral multiple of, either $a$ or $b$, said sheets being arranged in a three-dimensional array of sheet planes wherein at least one of said sheets is utilized to form a sheet plane so that $m$ and a given hole dimension $a$ of a sheet of said sheet plane have a common multiple so that each row of such sheet plane has exactly the correct number of holes to store a plurality $w$ of said $m$-bit words along such row of the sheet plane in bit interleaved fashion, a plurality of sensing circuits each linking one corresponding hole location of said rows in a plurality of sheet planes to form a plurality of sensing plane circuits, means connecting in series the sensing plane circuits linking corresponding bit locations of said words to form folded sensing plane circuits, and a plurality of additional electric circuits arranged in groups of $w$ circuits, each of said groups linking all holes in a different plane perpendicular to the planes of said sheets and said sensing plane circuits, each of the $w$ circuits of a group linking all bit positions of a different one of said $w$ words along a row in plural sheet planes of said three-dimensional array.

20. In a coinicident current magnetic memory operable in a cycle including read-out and write-in portions, a plurality of magnetic storage devices in a three-dimensional array of rows and columns and actuatable to different flux conditions to store bits of binary coded information, drive circuit means coupled to said storage devices for actuating said devices during read-out and write-in portions of the operating cycle of said memory, said drive circuit means comprising first circuit means applying electric signals of first and second polarities to activate selected portions of said storage devices between their different conditions to read out and write in information bits, said first circuit means being divided into a plurality of mutually perpendicular row plane and column plane circuits, second circuit means applying additional electric signals to selected ones of said storage devices in planes perpendicular to planes of both said row plane circuits and said column plane circuits, and said additional electric signals being applied during said write-in operation for inhibiting the transfer of such devices from a first one of said conditions to a second one of said conditions, said second circuit means being electromagnetically coupled to said first circuit devices through said selected means and thereby presenting to said first circuit means a first load impedance in the presence of said inhibiting signals and a second load impedance in the absence of such inhibiting signals, each of said row plane and column plane circuits and said second circuit means being divided into at least two portions, only one of which in each circuit is activated by electric signals at any one time, and each of said second circuit means portions is coupled to only a part of the energized portion of said first circuit means and is further coupled to only a part of the unenergized portion of said first circuit means.

21. The coincident current magnetic memory in accordane with claim 20 which comprises in addition a pulse generator, information-responsive coupling means applying pulses from said generator so said second circuit means, and said coupling means applying a pulse to a first portion of said second circuit means to write a binary ZERO in the activated portion of said first circuit means and applying a pulse to a second portion of said second circuit means when a binary ONE is to be written in said activated portion of said first circuit means.

22. A magnetic memory comprising a sheet of ferromagnetic material having a plurality of holes arranged in a matrix array of rows and columns, for storing binary coded information bits equal in number to the number of said holes, the portion of material surrounding each of said holes having a substantially rectangular hysteresis characteristic defining two remanent flux density conditions of opposite polarity between which such portion may be switched by the application of magnetomotive forces of full-select amplitude with appropriate polarity, first circuit means arranged to apply signals to said holes and including a sheet circuit linking at least a predetermined group of said holes, said sheet circuit linking adjacent ones of said holes along said sheet circuit in opposite sense, plural pairs of row circuits, each pair linking holes in a different row of said group, and each circuit of a pair linking no more than two adjacent holes at a time along its row, said signals generating a full-select magnetomotive force in at least one of the holes of a selected group for driving the corresponding material to a first one of its remanent flux density conditions and for generating a part-select amplitude magnetomotive force in the additional holes of the selected group, second circuit means arranged to apply to at least a part of said selected group of holes an inhibiting signal of part-select amplitude and of opposite polarity with respect to signals applied to the same holes by said first circuit means, said second circuit means including a plurality of column circuits each linking in each of said rows holes that are also linked by each of the circuits of the row circuit pair for that row, and said first and second circuit means being further arranged with respect to said array so that magnetomotive forces generated in said holes constrain magnetic flux to paths around single holes, the further arrangement being such that in each row and column of said array the holes adjacent to a fully selected hole in that row or column are either fully selected with opposite sense or receive no more than a net part-select force of opposite sense.

23. In a magnetic memory including a coordinate array of rows and columns of bistable magnetic storage devices for storing binary ONE and ZERO information bits as represented by one or the other of their stable states, a single sensing circuit copled to all of said devices in at least a predetermined segment of a plane of said array, plural drive circuits coupled to the devices in said rows and columns, respectively, for applying drive signals to selected devices in said plane segment, at least two inhibit circuits each coupled to a different portion of the devices of said plane segment, means comprising a source of pulses supplying a pulse each time either a ONE or a ZERO is to be stored in said plane segment, and means coupling each pulse from said source to one or the other of said inhibit circuits.

24. The magnetic memory in accordance with claim 23 in which, half of the devices in said plane segment have their inhibit circuit electrically oriented the same as a sensing circuit portion coupled to such devices and the other half of such devices have their inhibit circuit electrically oriented with opposite polarity with respect to the sensing circuit portions coupled to such devices, said devices being characterized in that the voltage magnitude of signals coupled to said sensing circuit from a device is at a first magnitude for a device in which the last-received signal was on an inhibit circuit only and at a second magnitude for a device in which the last-received signal was on one or more of said drive circuits only, and the coupling of said inhibit circuits with each of the devices along any given row of said plane segment being such that said sensing circuit signals at such devices are substantially half at each of said magnitudes and approximately equal portions of each half of said voltages are of opposite polarity with respect to one another.

25. The magnetic memory in accordance with claim 23 in which, said array is a three-dimensional array including a plurality of planes and each such plane is folded to form at least two parallel subplanes, each of said subplanes including a part of said segment of such plane, and each of said inhibit circuits is coupled to a different one of said subplanes.

26. The magnetic memory in accordance with claim 24 in which.

said array is a three-dimensional array including a plurality of planes and each such plane is folded to form at least two parallel subplanes, each of said subplanes including a part of said segment of such plane, and each of said inhibit circuits is coupled to a different one of said subplanes.

27. In a magnetic memory including a coordinate array of rows and columns of bistable magnetic storage devices for storing binary ONE and ZERO information bits as represented by one or the other of their stable states, a single sensing circuit coupled to all of said devices in at least a predetermined segment of a plane of said array, plural drive circuits coupled to the devices in said rows and columns, respectively, for applying drive signals to selected devices in said plane segment, at least two inhibit circuits each coupled to a different portion of the devices of said plane segment, a source of pulses, means coupling each pulse from said source to one or the other of said inhibit circuits, half of the devices in said plane segment have their inhibit circuit electrically oriented the same as a sensing circuit portion coupled to such devices and the other half of such devices have their inhibit circuit electrically oriented with opposite polarity with respect to the sensing circuit portions coupled to such devices, said devices being characterized in that the voltage magnitude of signals coupled to said sensing circuit from a device is at a first magnitude for a device in which the last-received signal was on an inhibit circuit only and at a second magnitude for a device in which the last-received signal was on one or more of said drive circuits only, said array is a three-dimensional array including a plurality of planes and each such plane is folded to form at least two parallel subplanes, each of said subplanes including a part of said segment of such plane, each of said inhibit circuits being coupled to a different one of said subplanes, each subplane inhibit circuit is divided into a plurality of parts, and means crossconnect an inhibit circuit part in each subplane of a folded plane segment to at least one inhibit circuit part in another subplane of the same folded plane segment so that along each coordinate row and column within said segment of such folded plane half of the devices along such coordinate within the segment are linked by different inhibit circuits and within each such half of the devices approximately equal numbers of the devices couple voltages to the sensing circuit at each of said two magnitudes.

References Cited

UNITED STATES PATENTS

| | | | |
|---|---|---|---|
| 3,208,053 | 9/1965 | Elovic | 340—174 |
| 3,209,335 | 9/1965 | Shevel | 340—174 |
| 3,212,068 | 10/1965 | Vinal | 340—174 |

FOREIGN PATENTS 900,780 7/1962 Great Britain.

OTHER REFERENCES

IBM Technical Disclosure Bulletin, vol. 6, No. 4, September 1963, pp. 55 and 56, "Crossover Balanced Inhibit Segments" by Councill et al.

STANLEY M. URYNOWICZ, Jr., *Primary Examiner.*